US005461420A

United States Patent [19]
Yonemitsu et al.

[11] Patent Number: 5,461,420
[45] Date of Patent: Oct. 24, 1995

[54] APPARATUS FOR CODING AND DECODING A DIGITAL VIDEO SIGNAL DERIVED FROM A MOTION PICTURE FILM SOURCE

[75] Inventors: Jun Yonemitsu, Kanagawa; Teruhiko Suzuki, Chiba; Yoichi Yagasaki, Kanagawa, all of Japan

[73] Assignee: Sony Corporation, Japan

[21] Appl. No.: 123,560

[22] Filed: Sep. 17, 1993

[30] Foreign Application Priority Data

Sep. 18, 1992 [JP] Japan .................................. 4-249791
Sep. 18, 1992 [JP] Japan .................................. 4-249792
Jul. 6, 1993 [JP] Japan .................................. 5-166746

[51] Int. Cl.$^6$ ...................................................... H04N 7/50
[52] U.S. Cl. ........................... 348/401; 358/415; 358/416; 348/911
[58] Field of Search ............................... 348/401, 415, 348/416, 439, 97, 911; H04N 7/13

[56] References Cited

U.S. PATENT DOCUMENTS

| 5,016,101 | 5/1991 | Richards | 348/452 |
| 5,221,966 | 6/1993 | Clayton | 348/443 |
| 5,255,091 | 10/1993 | Lyon | 348/443 |
| 5,267,035 | 11/1993 | Weckenbrock | 348/416 |
| 5,272,529 | 12/1993 | Frederiksen | 348/405 |

FOREIGN PATENT DOCUMENTS

| 0395276A | 10/1990 | European Pat. Off. | H04N 5/84 |
| 2240232 | 7/1991 | United Kingdom | H04N 7/01 |
| WO91/06182 | 5/1991 | WIPO | H04N 7/01 |

OTHER PUBLICATIONS

Woo Paik, "Digicipher–All Digital, Channel Compatible, HDTV Broadcast System," IEEE, 1990, vol. 36, No. 4, pp. 245–254.

Primary Examiner—Howard W. Britton
Attorney, Agent, or Firm—Limbach & Limbach; Ian Hardcastle

[57] ABSTRACT

A method for coding an input video signal with a field rate of 60 Hz derived from a motion picture film source using 2–3 pulldown. In the method, duplicate fields are detected in the input video signal. Each duplicate field is eliminated from the input video signal to produce a progressive video signal comprising plural frames with a frame rate of 24 Hz. Finally, the progressive video signal is coded to produce a coded video signal. Preferably, when a duplicate field is detected in the input video signal, a control signal is generated in response to each detected duplicated field. Each control signal is then included in the coded video signal.

25 Claims, 18 Drawing Sheets

F I G. 15
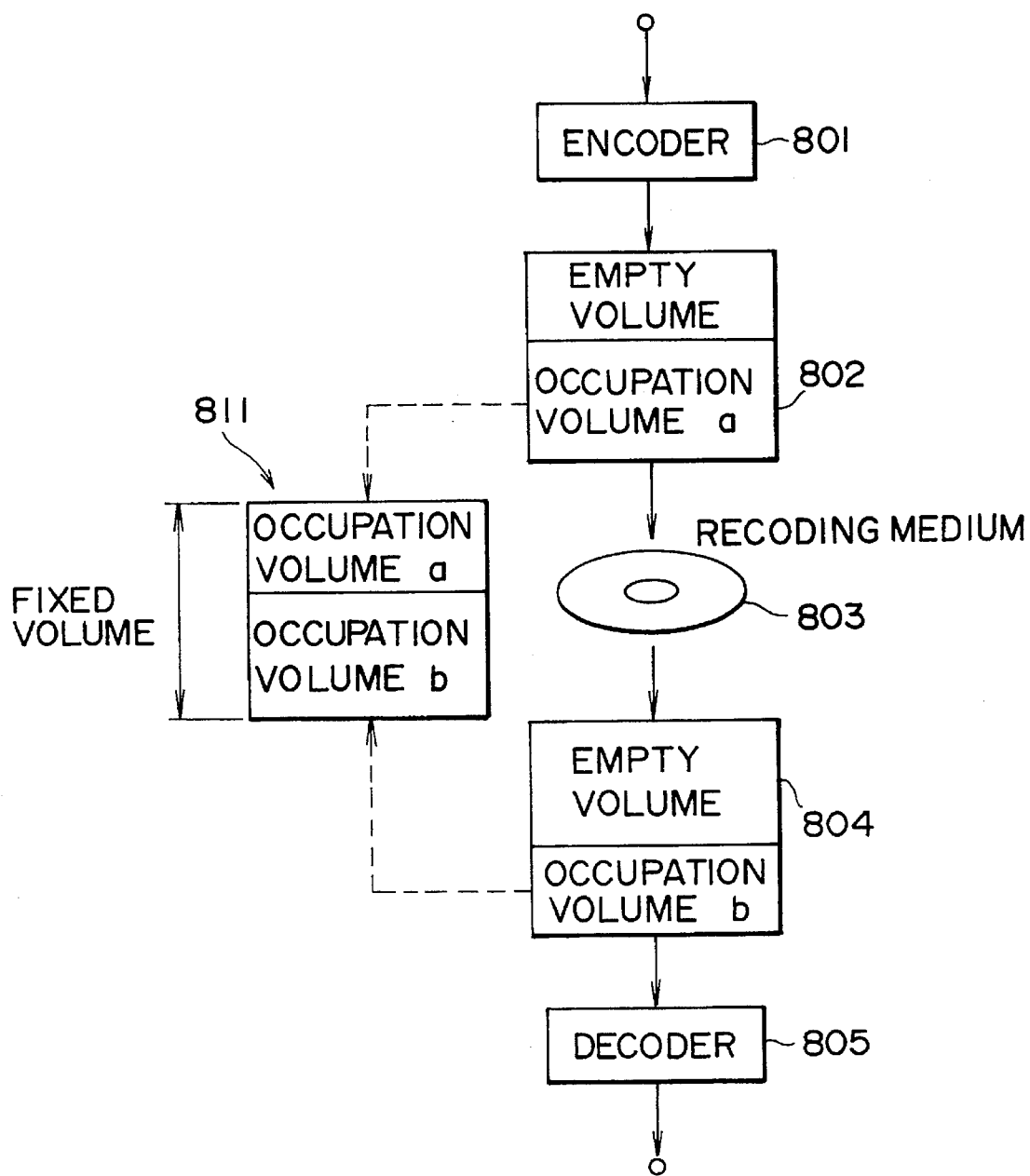

FIG. 18

APPARATUS FOR CODING AND DECODING A DIGITAL VIDEO SIGNAL DERIVED FROM A MOTION PICTURE FILM SOURCE

FIELD OF THE INVENTION

The present invention relates to apparatus for coding and decoding a digital video signal with a field rate of 60 Hz derived from a motion picture film source with a frame rate of 24 Hz.

BACKGROUND OF THE INVENTION

The Motion Picture Experts Group (MPEG) standard is representative of a standard for compressing digital video signals for transmission or storage. The standard was discussed by ISO-IEC/JTC1/SC2/WG11 and has been proposed as a draft standard. The standard stipulates a hybrid compression method, combining motion compensated prediction coding with discrete cosine transform (DCT) coding.

The first compression technique, motion compensated prediction coding, takes advantage of the correlation of video signals in the time domain. According to this method, the video signal representing the current picture (a frame or a field) is predicted from the decoded and reproduced (reconstituted) video signal representing a reference picture, which is a picture that is earlier or later than the current picture. Only the motion prediction errors between the video signal representing the current picture and the reconstituted video signal representing the reference picture are transmitted or stored. This significantly reduces the amount of digital video signal required to represent the current picture.

The second compression technique, DCT coding, takes advantage of the intra-picture, two-dimensional correlation of a video signal. According to this technique, when a block of the current picture, or a block of motion prediction errors, is orthogonally transformed, signal power is concentrated in specific frequency components. Consequently, quantizing bits need only be allocated to the DCT coefficients in the region in which the signal power is concentrated. This further reduces the quantity of digital video signal required to represent the picture. For example, in a region in which the image has little detail, and in which the video signal is thus highly correlated, the DCT coefficients are concentrated at low frequencies. In that case, only the DCT coefficients in the low-frequency region of the distribution pattern are quantized to reduce the quantity of the digital video signal.

Because the coding techniques of the MPEG standard are basically intended for use with interlaced video signals, problems arise when they are applied without modification to non-interlaced video signals. In particular, the compression ratio can be impaired when the MPEG techniques are applied to non-interlaced video signals.

A motion picture consists of a sequence of still pictures reproduced in succession, normally 24 pictures per second. A motion picture film source, e.g., a motion picture film or a 24-frame video signal, represents each picture of the motion picture as a full frame with a frame rate of 24 Hz, whereas an interlaced video signal represents each picture of the motion picture as two consecutive fields, each field representing half of the picture and being displaced from one the other by one line. An NTSC interlaced video signal has a field rate of 60 Hz. Consequently, deriving an interlaced video signal with a field rate of 60 Hz from a motion picture film source with a frame rate of 24 Hz, such as is done using a telecine machine, requires a conversion between the number of frames per second of the film source and the number of fields per second in the video signal.

A motion picture film source with a 24 Hz frame rate is commonly converted to an interlaced video signal with a 60 Hz field rate, such as an NTSC video signal, by a technique known as 2–3 pull-down. FIG. 1 illustrates how 2–3 pull-down works.

The 2–3 pull-down process involves a repetitive sequence of deriving two fields of the video signal from the first of every two consecutive frames of the motion picture film source, and deriving three fields of the video signal from the second of the two consecutive frames of the film source. In FIG. 1, frames 800 and 801 are consecutive frames of a motion picture film source with a frame rate of 24 Hz. In the figure, each film source frame is divided into an odd field, indicated by a solid line, and an even field, indicated by a broken line.

First, two fields of the video signal are derived from the first film source frame 800. The video field 802, an odd field, is first derived from the first film source frame 800, followed by the second video field 803, an even field. Then, three fields of the video signal are derived from the second film source frame 801. The video field 804, an odd field, is first derived, followed by the video field 805, an even field, followed by the video field 806, another odd field. The two odd fields 804 and 806 are identical to one another. This process is repeated for the other two film source frames 808 and 809 from which the video fields 810 through 814 are derived. Note that an even field 810 is derived first from the film source frame 808, and that two even fields 812 and 814 are derived from the film source frame 809. With the arrangement shown, a sequence of ten fields of the video signal is derived from a sequence of four frames of the motion picture film source, after which the sequence is repeated.

FIG. 2 shows the result of combining into frames consecutive pairs of fields of the interlaced video signal derived by the process shown in FIG. 1. The video fields 900 and 901 are derived from the same film source frame. Video fields 902 and 903 are also derived from the same film source frame. Hence, the video frame 907, produced by combining the video fields 900 and 901, and the video frame 908, produced by combining the video fields 902 and 903, are each derived from the same film source frame. On the other hand, the video frame 909, produced by combining the consecutive video fields 904 and 905 is derived from two different film source flames.

When MPEG coding is applied to the flames of a non-interlaced video signal derived from an interlaced video signal, which, in turn, is derived a motion picture film source using 2–3 pulldown, coding the flames 907 and 908 in the above example presents no problems because these flames are each derived from a single film source frame, and are thus internally correlated. However, difficulties can be encountered when coding the video frame 909 because it is derived from two different flames of the film source, and, hence, it is not necessarily internally correlated.

If the motion picture is fast-moving, or if a scene change occurs within the frame, a video frame derived from two different flames of the film source has low vertical correlation, which reduces the efficiency of DCT-based signal compression. Moreover, motion compensated prediction can also go wrong because of the reduced correlation of the video signal.

OBJECTS AND SUMMARY OF THE INVENTION

In view of the problems described above, it is an object of the present invention to provide a video signal coding method and apparatus which allows efficient coding of a video signal derived from a motion picture film source using 2–3 pull-down technique, a corresponding video signal decoding method and apparatus, and a recording on which a coded recording signal is recorded.

Accordingly, the invention provides a method for coding an input video signal with a field rate of 60 Hz derived from a motion picture film source using 2–3 pulldown. In the method according to the invention, duplicate fields are detected in the input video signal. Each duplicate field is eliminated from the input video signal to produce a progressive video signal comprising plural frames with a frame rate of 24 Hz. Finally, the progressive video signal is coded to produce a coded video signal.

Preferably, when a duplicate field is detected in the input video signal, a control signal is generated in response to each detected duplicated field. Each control signal is then included in the coded video signal.

The invention also provides a method of decoding a coded video signal to provide an interlaced video signal with a field rate of 60 Hz. The coded video signal is a signal derived by coding a progressive video signal having a frame rate of 24 Hz. The progressive video signal was in turn derived from an interlaced video signal with a field rate of 60 Hz by eliminating duplicate fields. The coded signal includes a control signal indicating each frame of the progressive signal from which a duplicate field was removed. In the method, the coded video signal is decoded to provide the progressive video signal. The control signal is extracted from the coded video signal. Then, finally, three fields of the interlaced video signal are derived from certain frames of the progressive video signal and two fields of the interlaced video signal from the rest of the frames of the progressive video signal in response to the control signal.

Three fields of the interlaced video signal are preferably derived from those frames of the progressive video signal indicated by the control signal as being frames from which a duplicate field was eliminated.

The invention also provides a recording comprising a recording medium and a recording signal recorded in the recording medium. The recording signal includes a coded progressive video signal comprising plural frames from which a duplicate field has been eliminated. The recording signal also includes a control signal indicating the frames from which a duplicate field has been eliminated.

The invention further provides an apparatus for coding an input video signal with a field rate of 60 Hz derived from a motion picture film source using 2–3 pulldown. The apparatus comprises a circuit that detects duplicate fields in the input video signal and a circuit that eliminates each duplicate field from the input video signal to provide a progressive video signal having a frame rate of 24 Hz. Finally, the apparatus comprises a coding circuit that codes the progressive video signal to provide a coded video signal.

The detecting circuit may include a circuit that generates a control signal in response to each detected duplicated field, and the coding circuit may additionally comprise a circuit that includes each control signal in the coded video signal.

The invention yet farther provide an apparatus for decoding a coded video signal to provide an interlaced video signal with a field rate of 60 Hz. The coded video signal is a signal derived by coding a progressive video signal with a frame rate of 24 Hz. The progressive video signal is, in turn, derived from an interlaced video signal with a field rate of 60 Hz by eliminating duplicate fields. The coded signal includes a control signal indicating each frame of the progressive signal from which a duplicate field was removed. The apparatus comprises a decoding circuit that decodes the coded video signal to provide the progressive video signal; and a circuit that extracts the control signal from the coded video signal. Finally, the apparatus comprises a circuit that derives three fields of the interlaced video signal from certain frames of the progressive video signal and derives two fields of the interlaced video signal from the rest of the frames of the progressive video signal in response to the control signal.

The deriving circuit preferably derives three fields of the interlaced video signal from those frames of the progressive video signal indicated by the control signal as being frames from which a duplicate field was eliminated.

The invention finally provides a system for deriving a recording signal from an input video signal and for reproducing the recorded signal to provide an output signal. The recording signal has a bit rate that is substantially lower than the bit rate of the input video signal and the output video signal. The input video signal and the output video signal have a field rate of 60 Hz. The input video signal is derived from a motion picture film source using 2–3 pulldown. The system comprises and encoding apparatus and a decoding apparatus. The encoding apparatus includes a detecting circuit that detects duplicate fields in the input video signal, and a circuit that eliminates each duplicate field from the input video signal to provide a progressive video signal having a frame rate of 24 Hz. The encoding apparatus also includes a coding circuit that codes the progressive video signal to provide the recording signal. The decoding apparatus includes a circuit that decodes the recording signal to provide the progressive video signal, and a field deriving circuit that derives three fields of the interlaced video signal from certain frames of the progressive video signal and derives two fields of the interlaced video signal from the rest of the frames of the progressive video signal.

Preferably, the detecting circuit in the encoding apparatus includes a circuit that generates a control signal in response to each detected duplicated field, and the coding circuit additionally includes each control signal in the recording signal. The decoding apparatus also preferably additionally includes a circuit that extracts the control signal from the recording signal, and the field deriving means derives three fields of the interlaced video signal from certain frames of the progressive video signal and two fields of the interlaced video signal from the rest of the frames of the progressive video signal in response to the control signal from the extracting circuit.

BRIEF DESCRIPTION OF THE DRAWINGS

FIG. 15 is a block diagram illustrating the concept of the video buffering verifier.

FIG. 18 illustrates how the rate conversion circuit derives a video signal with a field rate of 60 Hz from a recorded signal with a frame rate of 24 Hz recorded according to the second variation of the first recording method.

DETAILED DESCRIPTION OF THE INVENTION

Figure 3:
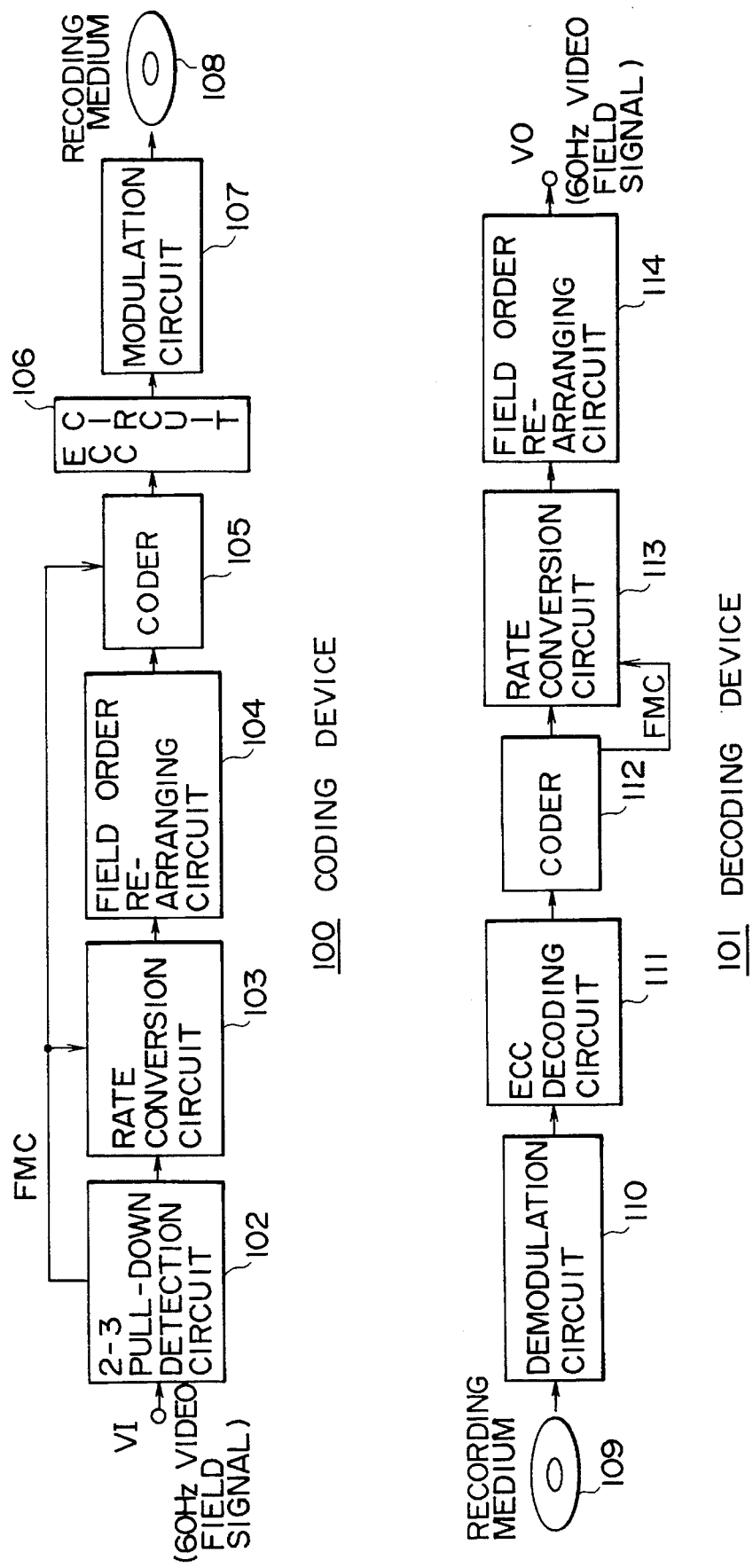
FIG. 3 is a block diagram of a coding apparatus and a decoding apparatus constituting an image processing apparatus of a first embodiment of the invention.

A first embodiment of the present invention will first be described with reference to FIG. 3, which shows a block diagram of the coding apparatus 100 and the decoding apparatus 101.

The coding apparatus 100 will be described first. The coder input signal VI, an interlaced video signal with a field rate of 60 Hz is fed into the 2-3 pull-down detection circuit 102 which will be described in detail below. Each time the 2-3 pull-down detection circuit 102 detects a duplicated field in the coder input signal VI, it generates a field mode change signal FMC, which it sends to the rate conversion circuit 103. In response to the field mode change signal FMC, the rate conversion circuit 103 removes each duplicated field from the coder input signal VI, and sends the resulting video signal to the field order re-arrangement circuit 104. The field order re-arrangement circuit 104 converts the signal from the rate conversion circuit 103 into a progressive (non-interlaced) picture signal having a frame-rate of 24 Hz. The encoder 105 then compresses and codes the picture signal, and feeds the result to the ECC circuit 106, which adds error correction codes. The modulation circuit 107 modulates the signal from the ECC circuit for recording on the recording medium 108.

The decoding apparatus 101 receives the signal reproduced from the recording medium 109. The recording medium 109 is the same as, or is derived from, the recording medium 108 on which the signal generated by the coding apparatus 100 is recorded. The reproduced signal is demodulated by the demodulation circuit 110, and fed to the ECC decoding circuit 111, where error detection and correction is applied. The decoder 112 decodes the signal from the ECC decoding circuit into pictures with a frame rate of 24 Hz. The rate conversion circuit 113 converts the picture signal with a frame rate of 24 Hz into a video signal with a field rate of 60 Hz. The field order re-arrangement circuit 114 returns the field order of the video signal with a 60 Hz field rate from the decoder 112 to that of the coder input signal VI, and provides the decoder apparatus output signal VO with a field rate of 60 Hz.

Figure 4:
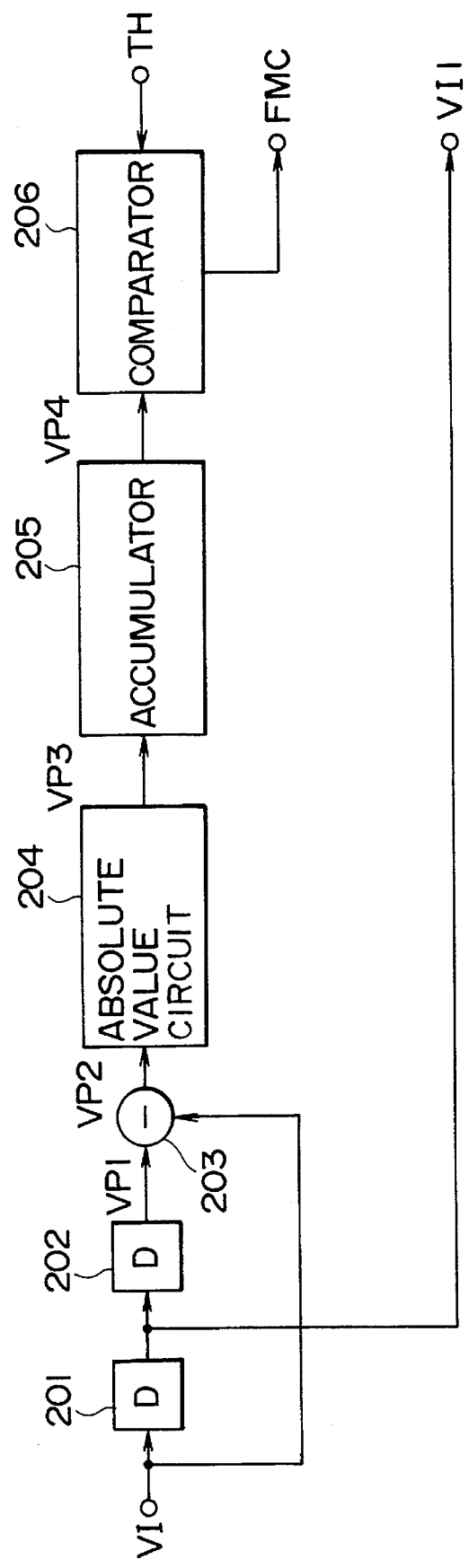
FIG. 4 is a block diagram of the 2–3 pull-down detection circuit included in FIG. 3.

Operation of the 2-3 pull-down detection circuit 102 will now be described with reference to FIG. 4. The field delay circuits 201 and 202 convert the coder input signal VI, a video signal with a field rate of 60 Hz, into the delayed signal VP1, by a time delay equal to two field periods, i.e., $\frac{1}{30}$ second. The difference calculator 203 receives the delayed signal VP1 and the coder input signal VI, and calculates the difference VP2 between each corresponding picture element (pixel) in the two signals.

The absolute value calculator 204 calculates the absolute value VP3 of the difference VP2 calculated for each pixel by the difference calculator 203, and feeds the result to the accumulator 205, which calculates the sum of the absolute value of the difference for each pixel in the field. The comparator 206 compares the resulting absolute value difference sum with a threshold value TH. When the frame of the coder input signal VI is a duplicated field, and can thus be removed, the absolute value difference sum VP4 is smaller than the threshold value TH, and the comparator 206 generates the field mode change signal FMC.

Figure 1:
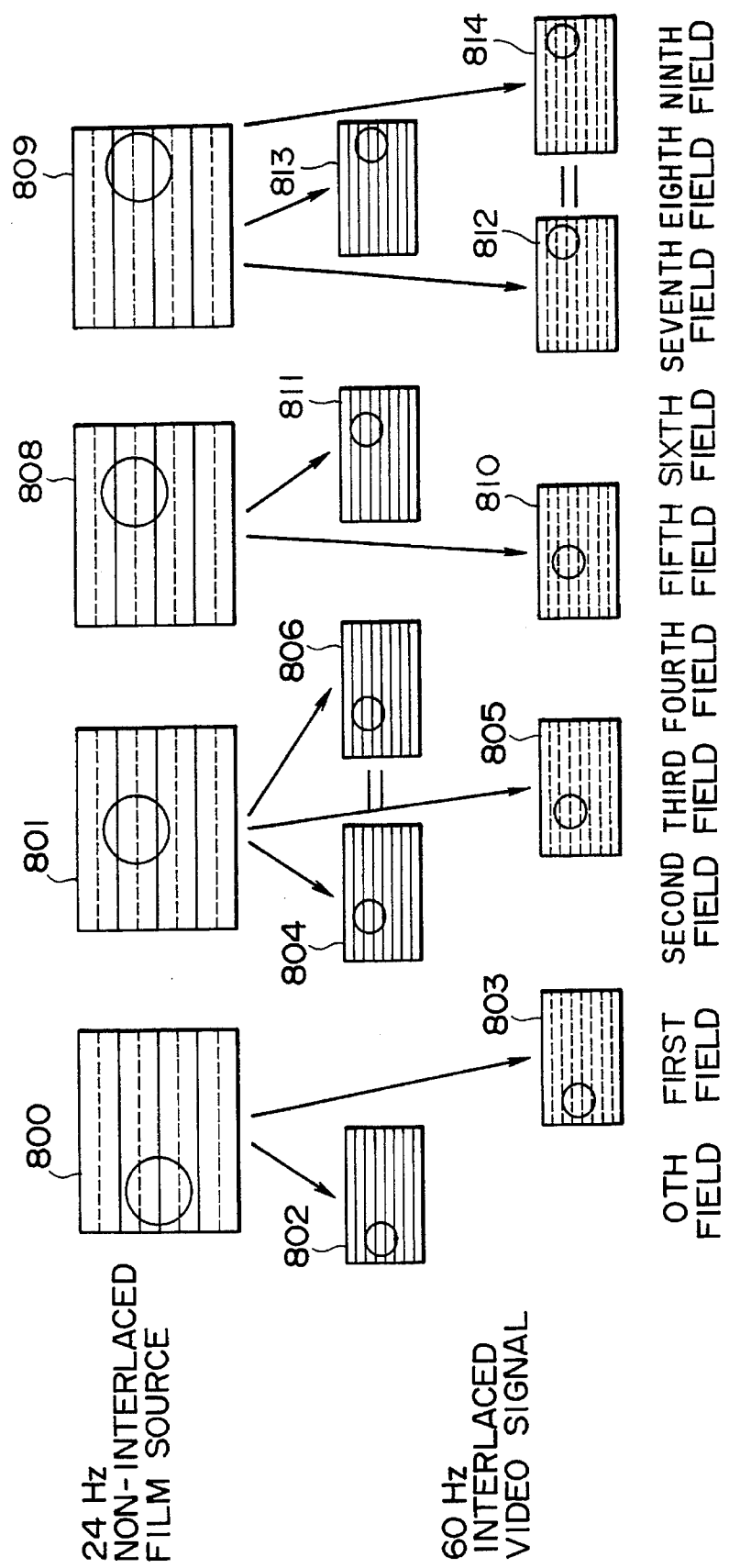
FIG. 1 illustrates the operating principles of the 2–3 pull-down process.
Figure 2:
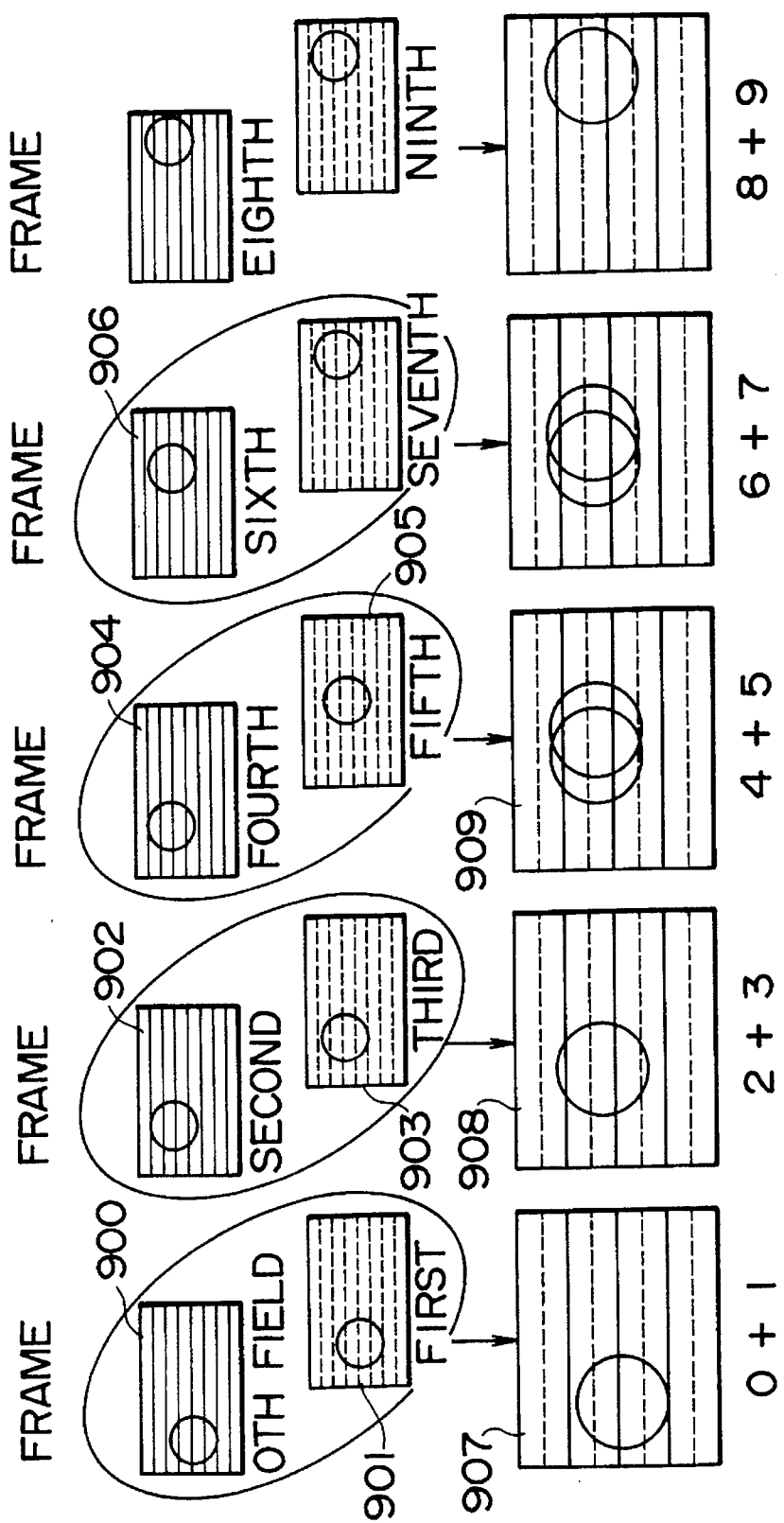
FIG. 2 depicts how the efficiency of coding drops when applied to frames resulting from fields derived from different film source frames using the 2–3 pull-down process.
Figure 5:
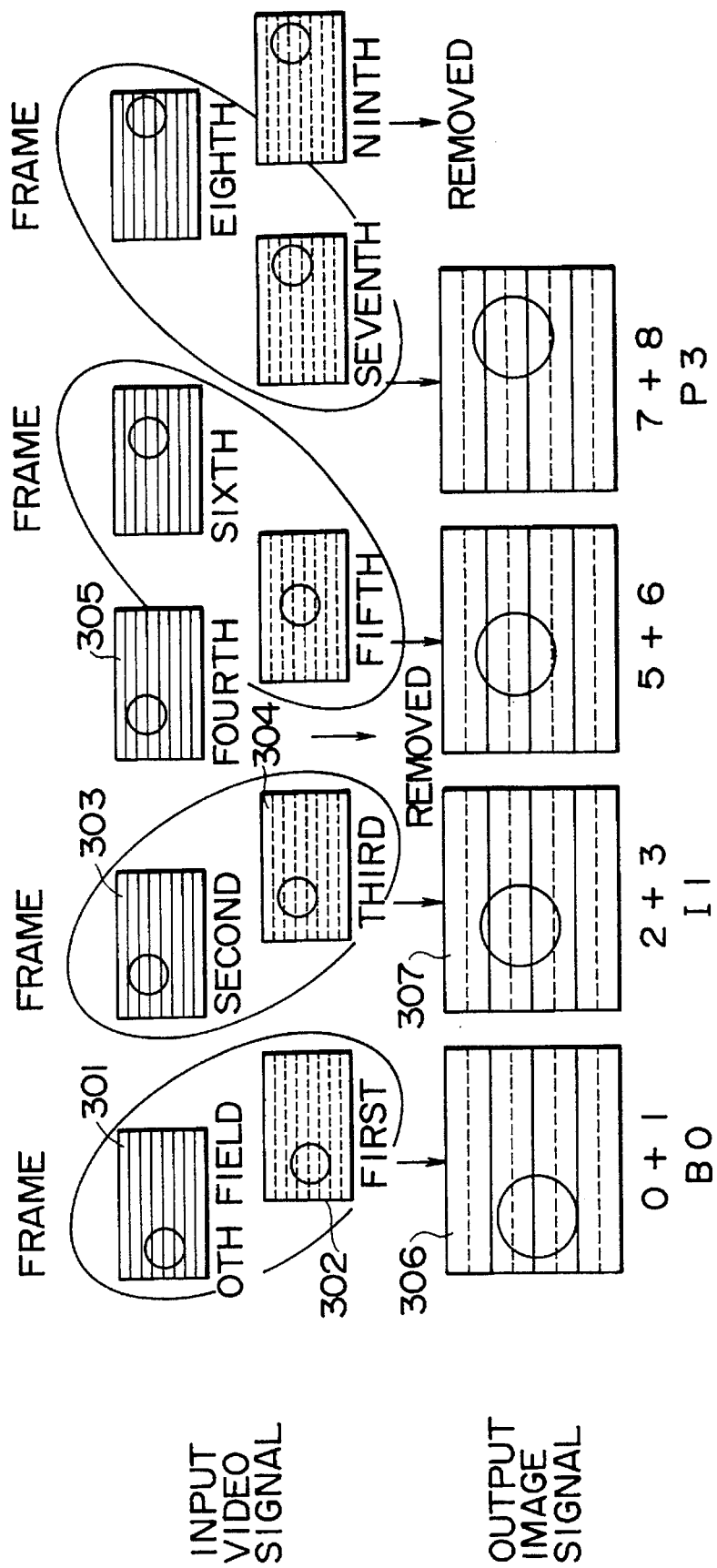
FIG. 5 shows how duplicate fields handled by the rate conversion circuit in FIG. 3.

The video signal VI1, delayed by one field period relative to the video signal VI by the field delay circuit 201, is fed to the rate conversion circuit 103, the operation of which is illustrated in FIG. 5. When the delayed video signal VI1 fed into the rate conversion circuit 103 (FIG. 1) is an interlaced video signal with a field rate of 60 Hz and is derived from a motion picture film source using 2-3 pull-down, as described above, the field 301 and the field 302 originate from the same film source frame. The fields 303 to 305 also all originate from one film source frame, different from that from which the fields 301 and 302 originate. Since the field 303 and the field 305 are identical (duplicated fields) as a result of the 2-3 pull-down, the field 305 provides excess information.

Accordingly, when the field mode change signal FMC from the 2-3 pull-down detection circuit 102 indicates that a field, such as the field 305, is a duplicated field, the rate conversion circuit 103 treats the field as a duplicated field and removes the field from the video signal VI1. The rate conversion circuit then sends the resulting video signal VI4 to the field order re-arrangement circuit 104, which rearranges to order of the fields in the video signal VI4 to that required by the coding order of the encoder 105. The field order rearrangement circuit 104 may also interleave the two fields constituting each frame to provide a progressive picture.

Figure 6:
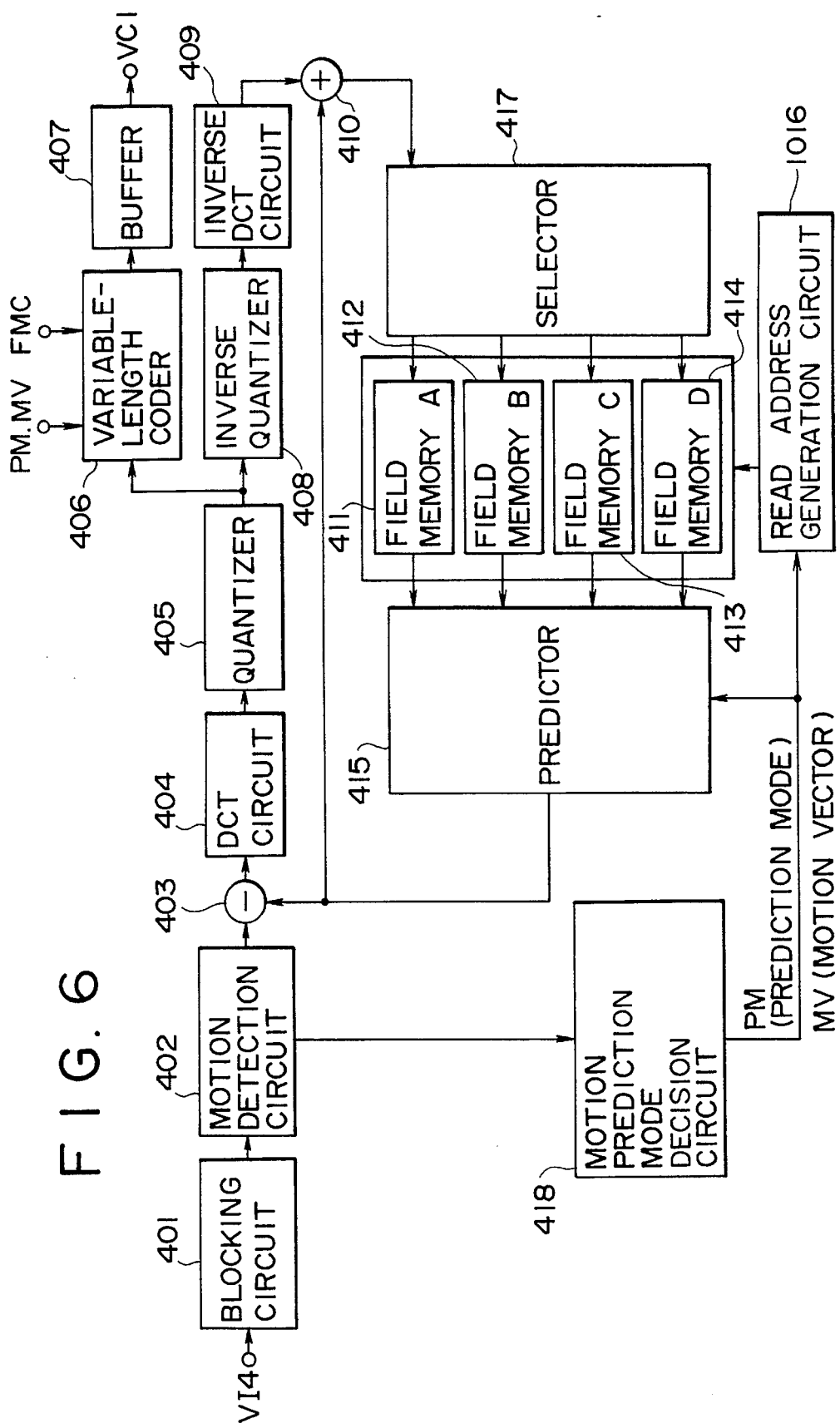
FIG. 6 is a block diagram of the encoder 105 in FIG. 3.

FIG. 6 is a block diagram of the encoder 105. The video signal VI4 from the field-order rearrangement circuit 104 is fed to the blocking circuit 401, which divides the signal VI4 into macro blocks of, preferably, 16×16 pixels. Each macro block is fed to the difference detector 403 via the motion detection circuit 402, which will be described below.

The difference detector 403 also receives macro blocks of motion-compensated pixels from the field memory set with motion compensation formed by the field memories 411 to 414 and the predictor 415, which will also be described below. The difference detector determines the pixel-by-pixel differences between the macro block of pixels and the macro block of motion-compensated pixels.

The macro blocks of motion prediction errors from the difference detector 403 are fed to the DCT circuit 404, which orthogonally transforms the motion prediction errors in blocks obtained by dividing each macro block in four. The DCT circuit 404 preferably applies a discrete cosine transform (DCT) to each block. The DCT coefficients provided by the DCT circuit 404 are fed to the quantizer 405 where they are quantized using an adaptively allocated number of bits. The quantized DCT coefficients are then fed to the variable-length coder 406, where variable-length coding such as Huffman coding, or run-length limited coding, is applied. The variable-length coder 406 also combines the motion vector MV, the prediction mode signal PM, and the field mode change signal FMC with the quantized DCT coefficients. The output of the variable length coding circuit 406 is fed into the encoder buffer 407, which provides the encoder output signal VC1, normally at a constant bit rate. It is to be noted that, though omitted from FIG. 6, a signal for preventing the encoder buffer 407 from overflowing or underflowing is fed back from the encoder buffer 407 to the quantizer 405.

The quantizer 405 also feeds the quantized DCT coefficients to the field memories 411 to 414 with motion compensation via the dequantizer 408, the inverse DCT circuit 409, the adder 410, and the selector 417. The dequantizer reverses the quantizing performed by the quantizer 405, and the inverse DCT circuit 409 reverses the DCT processing performed by the DCT circuit 404. The adder 410 reconstitutes a macro block of the current picture by adding each macro block of reconstituted motion prediction errors from the inverse DCT circuit 408 to a motion-compensated macro block of a reference picture derived from one or more earlier pictures stored in the field memories 411 through 414 by the predictor 415. After the current picture has been completely reconstituted, it may then be stored in one of the field memories 411 through 414 selected by the selector 417 to serve as a reference picture for coding later pictures.

The macro blocks of pixels from the blocking circuit 401 are also fed into the motion detection circuit 402, which determines a motion vector for each macro block and also generates an absolute value difference sum for each macro block. The motion detection circuit 402 feeds the absolute value difference sum to the motion prediction mode determination circuit 418, which determines the motion prediction mode, as will be described below. The macro blocks of pixels also pass from the blocking circuit 401 through the motion detection circuit 402 to the difference detection circuit 403, which is described above.

The method by which the prediction mode of each macro block is selected will now be described in the case of bidirectional predictive coding (B-picture) with reference to FIG. 7. Three prediction modes are available:

(1) Forward prediction from an earlier reference picture;

(2) Linear prediction from both earlier and later pictures (each pixel in the macro block of the current picture is calculated by a linear calculation, such as by calculating an average value, from a pixel in a reference macro block in an earlier picture and a pixel in a reference macro block in a later picture; and (3) Backward prediction from a later reference picture.

Figure 7:
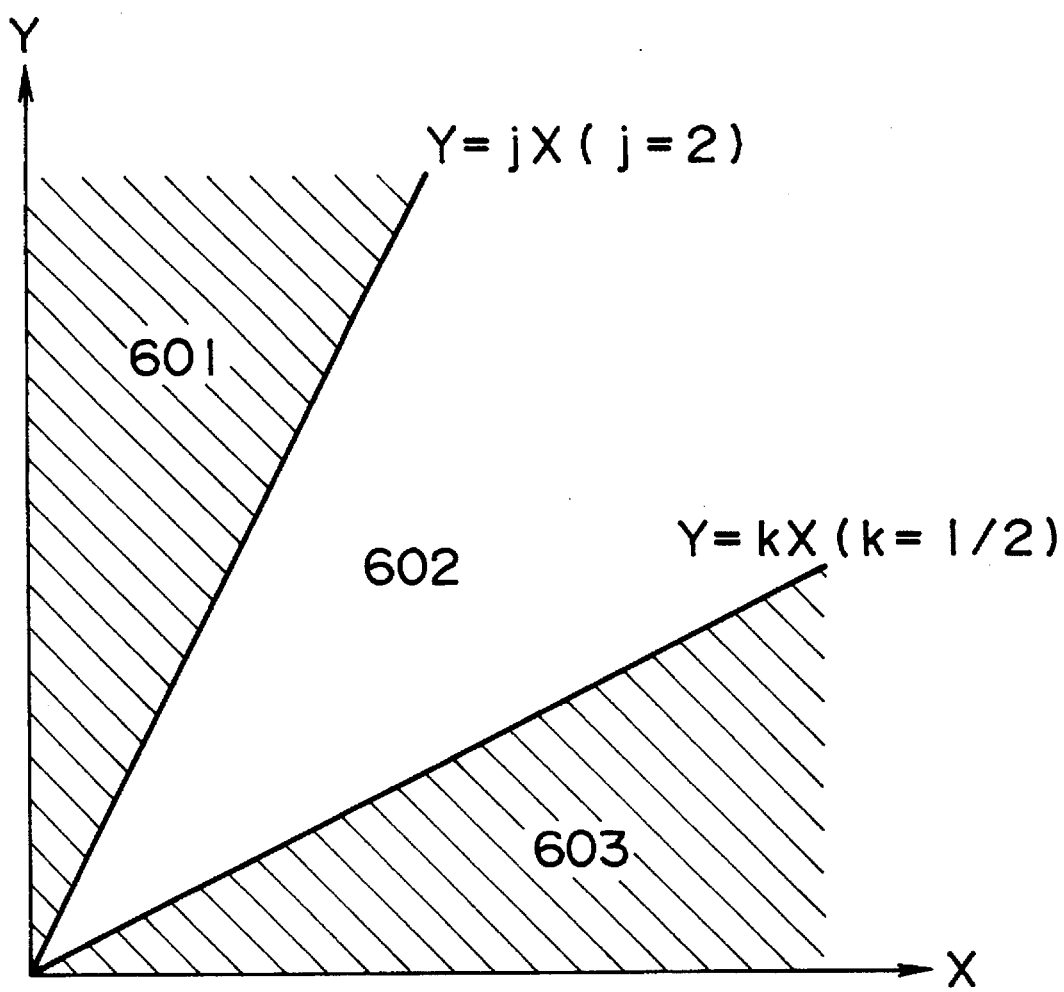
FIG. 7 shows how the motion prediction modes are selected in the encoder.

If the absolute value difference sum of the prediction error between the current picture and an earlier reference picture determined by the motion detection circuit 402 is represented by X, and the absolute value difference sum of the prediction error between the current picture and a later reference picture is represented by Y, then, as shown in FIG. 7:

when Y>jX, corresponding to the region 601, the motion prediction mode determination circuit 418 selects forward prediction from an earlier field or frame;

when kX≦Y≦jX, corresponding to the region 602, the motion prediction mode determination circuit 418 selects linear prediction from both earlier and later fields or frames; and when Y<kX, corresponding to the region 603, the motion prediction mode determination circuit 418 selects backward prediction from a later field or frame.

The motion prediction mode determination circuit 418 supplies the prediction mode PM and the motion vector MV to the predictor 415 of the field memory set with a motion compensation, and to the read address generation circuit 1016. The read addresses generated by the address generation circuit 1016 in accordance with the prediction mode PM and the motion vector MV are supplied to the field memories 411 to 414. The address generation circuit 1016 generates field memory addresses that are offset from the pixel addresses of the current macro block by the amount specified by the motion vector MV. Macro blocks of pixels are read out from the field memories according to addresses supplied by the read address generation circuit 1016, and are supplied to the predictor 415, which performs selection and interpolation in accordance with the prediction mode PM. Thus, the field memories 411 to 414 with motion compensation and the predictor 415 perform motion compensation using the prediction mode PM and the motion vector MV.

Figure 8:
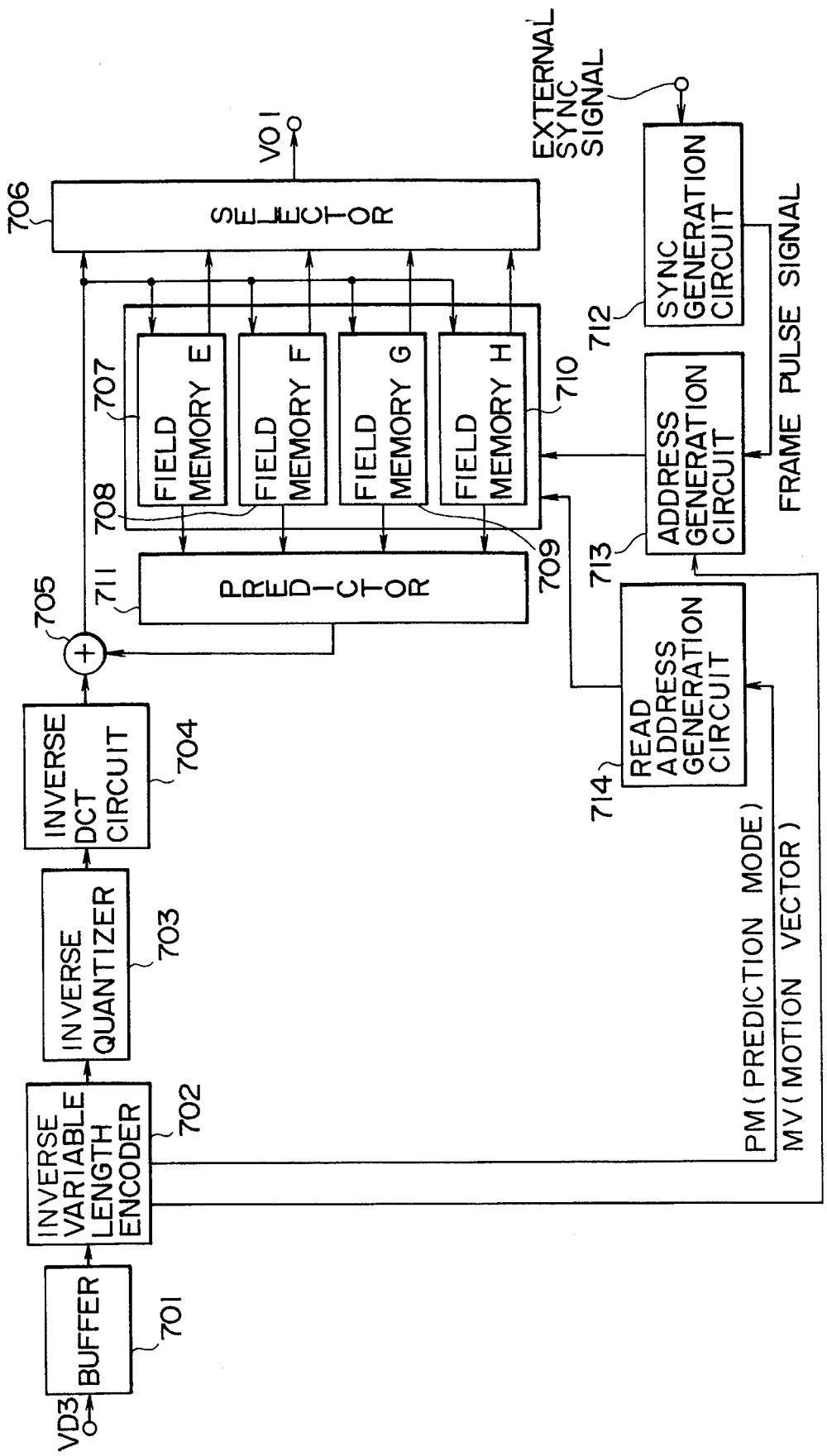
FIG. 8 is a block diagram of the decoder 113 of the decoding apparatus shown in FIG. 3.

The decoder 112 of the decoding apparatus 101 of the first embodiment will now be described in detail with reference to the block diagram shown in FIG. 8.

The decoder input signal VD3 to the decoder 112 is temporarily stored in the decoder buffer 701. The variable length decoder 702 reverses the variable length coding of the DCT coefficients received from the decoder buffer, and extracts the motion vector MV, the prediction mode PM, and the field change mode signal FMC. The dequantizer 703 dequantizes the quantized DCT coefficients, and the inverse DCT circuit 704 transforms the DCT coefficients into blocks of motion prediction errors. The dequantizer 703 and the inverse DCT circuit 704 are constructed to have characteristics that are complementary to those of the quantizer 405 and the DCT circuit 404, respectively, of the encoder shown in FIG. 6.

Macro blocks of motion prediction errors, formed by combining a square arrangement of four adjacent blocks from the inverse DCT circuit 704, are fed to one input of the adder 705, the other input of which is fed with motion-compensated macro blocks derived from one or more reference pictures by the predictor 711. The output of the adder 705, a reconstituted macro block of the current picture, is fed into one of the field memories in the field memory set with motion compensation consisting of the predictor 711 and the field memories 707 to 710. The reconstituted pictures stored in the field memories 707 to 710 serve as reference pictures for decoding later pictures, and are also fed out from the field memories with suitable timing by the selector 706 to form a picture of the decoder output signal VO 1.

The display address generation circuit 713 supplies a display address to the field memories 707 to 710. A frame pulse signal from a sync signal generation circuit 712, which generates sync signals in response to an external sync signal, is supplied to the display address generation circuit 713.

The field mode change signal FMC extracted by the variable length decoder 702, and the decoder output signal VO1 are fed into the rate conversion circuit 113. When the signal FMC indicates that a field was removed from the coder input signal, the rate conversion circuit duplicates the corresponding field in the decoder output signal to provide an output signal with a field rate of 60 Hz. The signal from the rate conversion circuit 113 passes to the field order rearranging circuit 114 where the field order of the signal from the rate conversion circuit is restored to that of the coder input signal, and provides the resulting signal as the decoding apparatus output signal VO, which has a field rate of 60 Hz.

Figure 9:
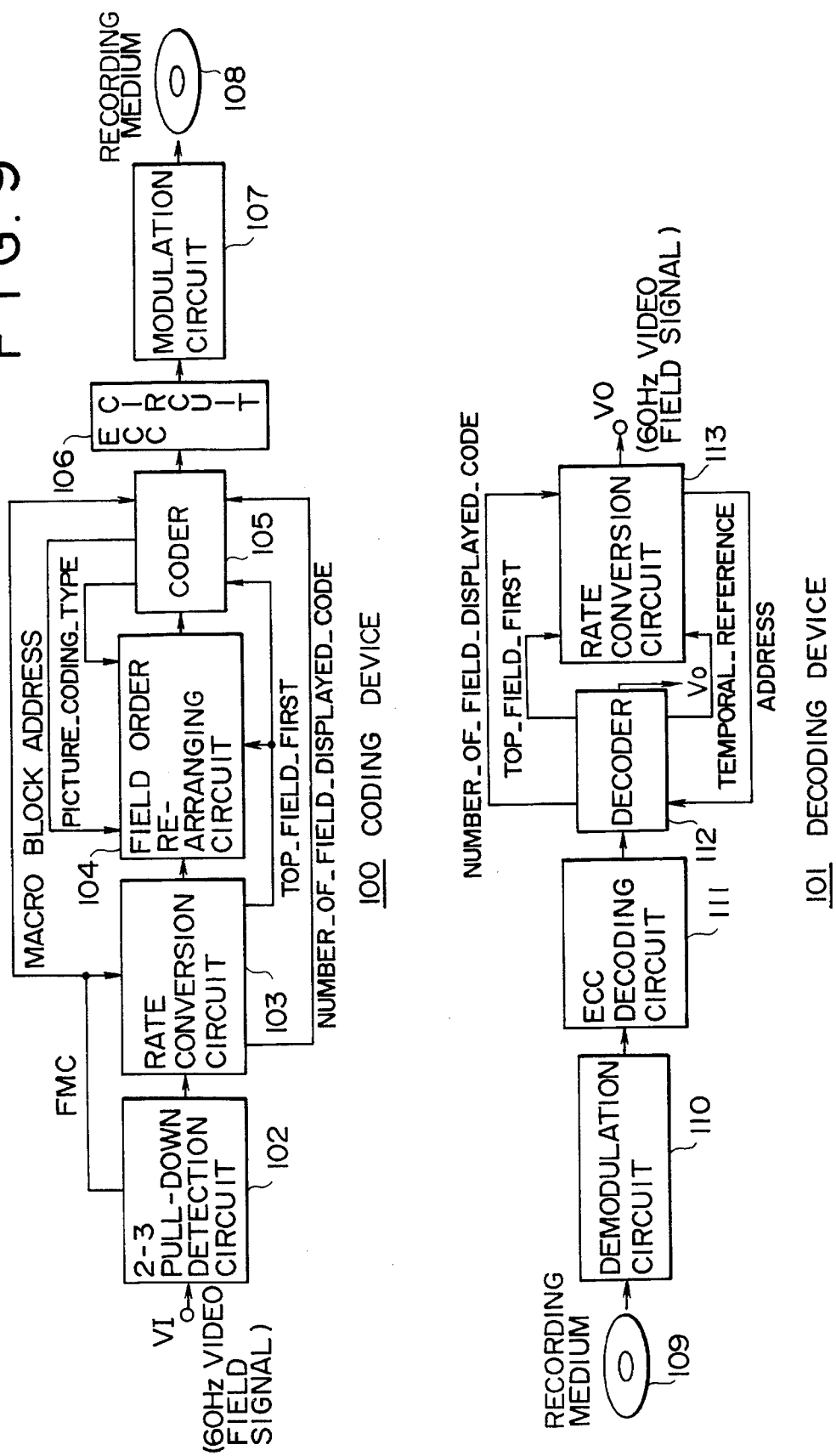
FIG. 9 is a block diagram of a coding apparatus and a decoding apparatus constituting an image processing apparatus of a second embodiment of the invention.

The second embodiment of the present invention will now be described with reference to FIG. 9 which shows a block diagram of the coding apparatus 100 and of the decoding apparatus 101. In FIG. 9, elements corresponding to those shown in FIG. 3 are indicated by same reference characters.

The coding apparatus 100 will be described first. The coder input signal VI, a video signal with a field rate of 60 Hz, is fed into the 2–3 pull-down detection circuit 102, where the field mode change signal FMC is generated each time a duplicate field is detected. In response to the field mode change signal, the rate conversion circuit 103 removes each duplicate field from the coder input signal VI, and sends the resulting video signal to the field order re-arrangement circuit 104.

The field order re-arrangement circuit 104 changes the order of the fields after rate conversion to that required by the encoder 105. The encoder 105 compresses and codes the picture signal after field-order rearrangement, and feeds the resulting coded signal to the ECC circuit 106, which adds error correction codes. The modulation circuit 107 modulates the signal from the ECC circuit 106 for recording on the recording medium 108. In addition, in the second embodiment, control signals, such as DSO or DFN, which will be described below, indicating the method by which the frame is to be displayed, are included in the signal recorded on the recording medium 108.

The decoding apparatus 101 will now be described. The signal recorded on the recording medium 109, which is derived from the recording medium 108, is reproduced, demodulated by the demodulation circuit 110, and fed into the ECC decoding circuit 111, where error detection and correction are applied. The decoder 112 decodes the signal from the ECC circuit into a video signal having a frame rate of 24 Hz.

The rate conversion circuit 113 generates addressing information for feeding to the decoder 112 to return the picture order of the video signal generated by the decoder 112 to that of the coder input signal VI, and to convert the rearranged signal into a video signal having field rate of 60 Hz. The decoder provides the resulting signal as the decoding apparatus output signal VO with a field rate of 60 Hz.

The operation and construction of the 2–3 pull-down detection circuit 102 of the present embodiment are similar to those of the first embodiment described above, and so will not be described again here.

While also the operation of the rate conversion circuit 103 is similar to that described above with reference to FIG. 5, the signals generated by the rate conversion circuit 103 in the second embodiment will be described with reference to FIG. 10.

The rate conversion circuit 103 of the second embodiment receives the field mode change signal FMC, described above, from the 2–3 pull-down detection circuit 102. When the rate conversion circuit 103 detects that the FMC signal is in its 1 state, it does not feed the corresponding duplicate field from the coder input signal to the field order re-arrangement circuit 104. On the other hand, when the rate conversion circuit detects that the FMC signal is in its 0 state, it feeds fields of the coder input signal unchanged to the field order re-arrangement circuit 104.

In addition, the rate conversion circuit 103 of the second embodiment generates a top_field_first flag DSO, which indicates the order in which the fields of the frame are to be displayed. The DSO flag is a 1-bit flag that can only have the values of 0 or 1. In its 1 state, the flag DSO indicates that the first field of the video signal of the frame to which the flag pertains is to be displayed first and the second field of the video signal is to be displayed second. On the other hand, in its 0 state, the flag DSO indicates that the second field of the video signal of the frame to which the flag pertains is to be displayed first and the first field is to be displayed second. Conventionally, the first-displayed field is an odd field.

The rate conversion circuit 103 also generates a number_of_field_displayed_code flag DFN, which indicates whether the frame to which the flag pertains is to be displayed as two fields or as three fields. Again, the DFN flag is a 1-bit flag that can only have the values of 0 or 1. In its 1 state, the flag DFN indicates that the frame to which the flag pertains is to be displayed as three fields. On the other hand, in its 0 state, the flag DFN indicates that the frame to which the flag pertains is to be displayed as two fields.

Figure 10:
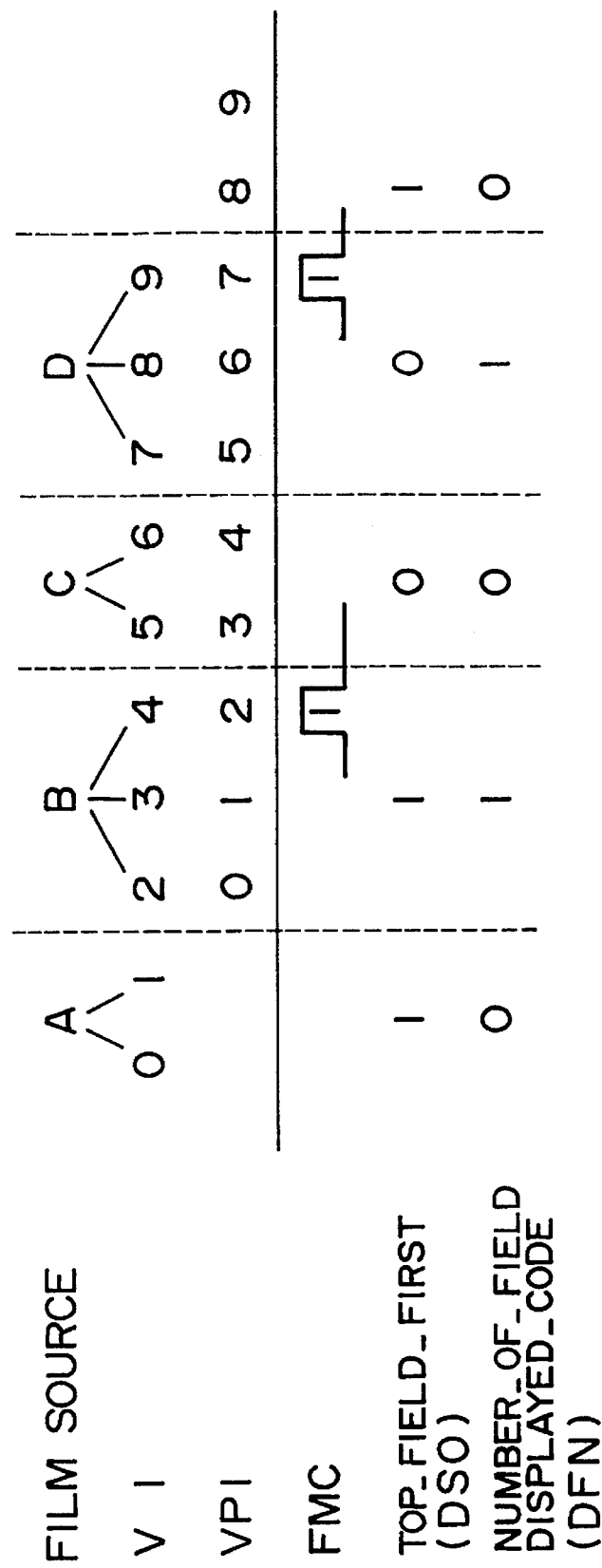
FIG. 10 illustrates how the various control signals are generated in the rate conversion circuit 103 shown in FIG. 9.

It can be seen in FIG. 10 that the 2–3 pull-down detection circuit 102 (FIG. 9) generates the field mode change signal when it detects the duplicate fields 4 and 9. The field 0 is a top field, so, in the output frame (a), corresponding to the film source frame A, the top_field_first flag DSO is in its 1 state, indicating that the first field of the frame is to be displayed first. Also, the output frame (a) is derived from only two fields of the coder input signal VI, so the number_of_field_displayed_code flag DFN is set to its 0 state.

The first field (field 2) of the output frame (b), corresponding to the film source frame B, is a top field, so the top_field_first flag DSO is set to its 1 state, indicating that the first field (field 2) of the frame is to be displayed before the second field (field 3). The output frame (b) is derived from three fields (fields 2, 3, and 4) of the coder input signal VI, so the number_of_field_displayed_code flag DFN is set to its 1 state to indicate that the output frame (b) must be displayed as three fields.

The first field (field 5) of the output frame (c), corresponding to the film source frame C, is a bottom field, so the top_field_first flag DSO is set to its 0 state, indicating that the second field (field 6, a top field) of the output frame (c) is to be displayed after the first field (field 5). The output frame (c) is derived from only two fields of the coder input signal VI, so the number_of_field_displayed_code flag DFN is set to its 0 state to indicate that the output frame (c) must be displayed as two fields.

Finally, the first field (field 7) of the output frame (d), corresponding to the film source frame D, is a bottom field, so the top_field_first flag DSO is set to its 0 state, indicating that the second field (field 8, a top field) of the output frame (d) is to be displayed after the first field (field 7). The output frame (d) is derived from three fields (fields 5, 6, and 7) of the coder input signal VI, so the number_of_field_displayed_code flag DFN is set to its 1 state to indicate that the output frame (d) must be displayed as three fields.

The rate conversion circuit 103 feeds the flags DSO and DFN to the encoder 105, and to the field order re-arrangement circuit 104.

Figure 11:
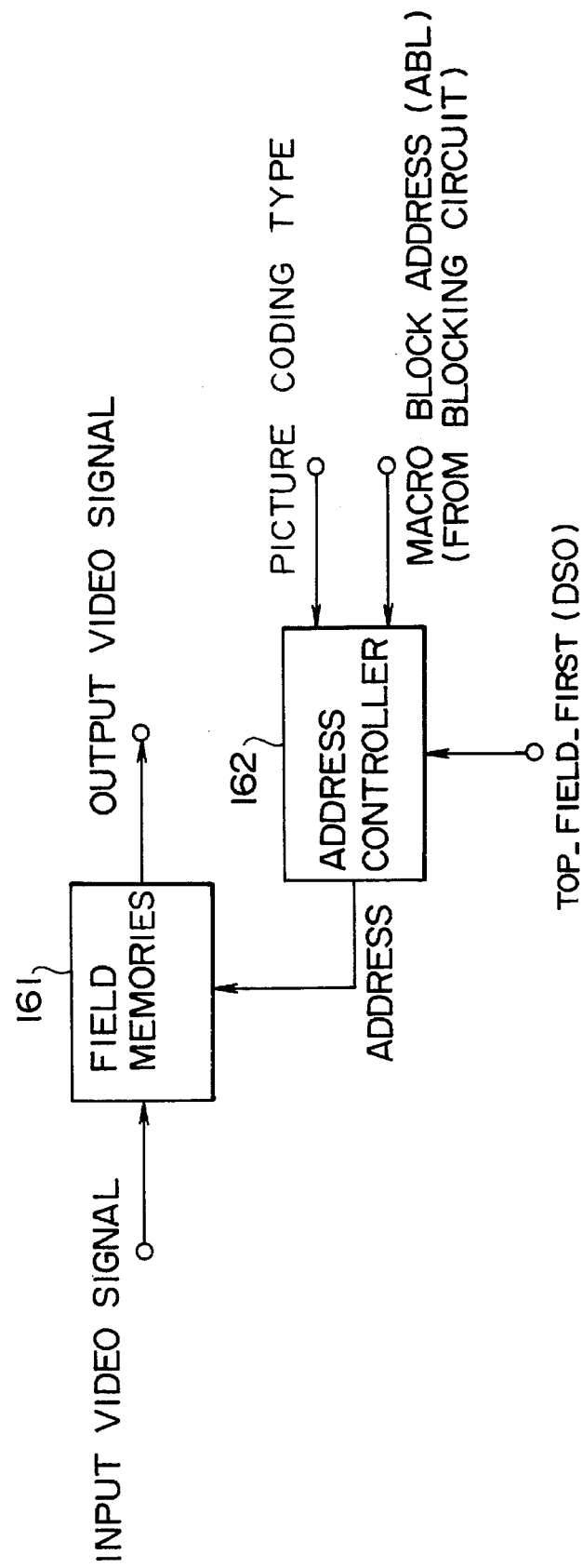
FIG. 11 is a block diagram of the field order rearranging circuit shown in FIG. 9.

Construction of the field order re-arrangement circuit 104 is shown in FIG. 11. The field order re-arrangement circuit 104 consists of a set of plural field memories 161 and the address controller 162.

The picture signal from the rate conversion circuit 103 is fed into the field order-rearrangement circuit 104, and is first recorded in the field memory set 161 at an address designated by the address controller 162. Then, the picture signal at the address designated by the address controller 162 is read out from the field memory set 161 and is fed to the encoder 105.

The address controller 162 generates addresses in response to the picture coding type signal PCT, the macro block address ABL, and the top_field_first flag DSO. The picture coding type signal PCT is generated by the picture coding type generator 420 in the encoder 105. The macro block address ABL is generated by the blocking circuit 401, also in the encoder 105. The top_field_first flag DSO is generated by the rate converter 103.

The field memory set 161 stores several fields. The address controller 162 refers to the signals PCT, ABL and DSO, generates an address where a picture signal received from the rate converter 103 will be written in the field memory set 161, and feeds the address to the memory set 161. The picture signal received from the field order re-arrangement circuit 104 is then written into the memory set 161 in accordance with the address.

Also, the address controller 162 refers to the signals PCT, ABL, and DSO, generates an address in the field memory set 161 where the macro block of the present picture signal to be fed to the encoder 105 is recorded, and feeds the address to the memory set 161. The macro block of the present picture signal read out of the field memory set 161 in accordance with the address is fed into to the encoder 105. By changing the order of the read out addresses relative to the recording addresses, the fields received from the rate conversion circuit 103 can be rearranged to provide the field order required by the encoder 105. Moreover, by reading alternate lines from consecutive fields, the field order rearrangement circuit can convert two interlaced fields into a single non-interlaced frame for frame mode coding.

Figure 12:
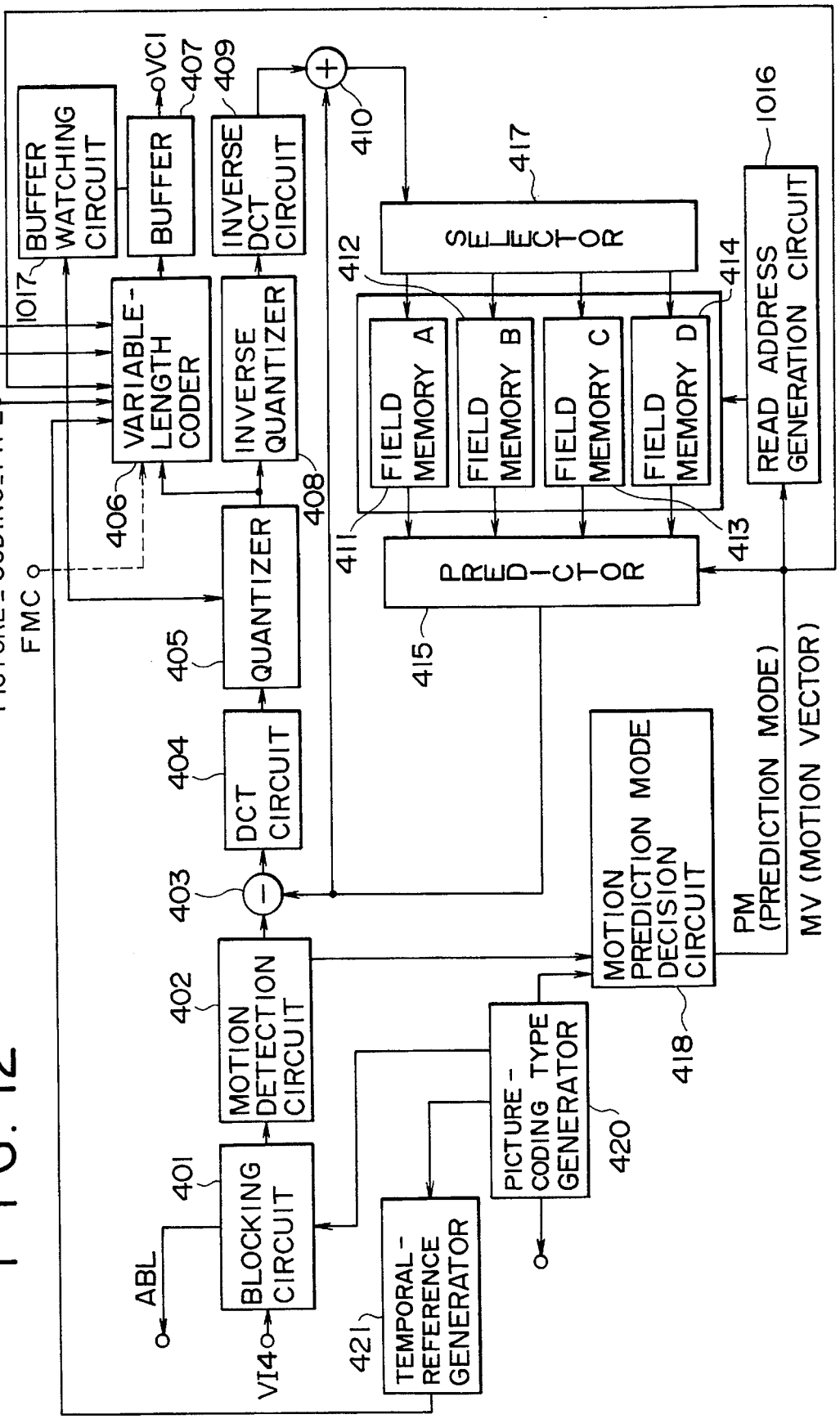
FIG. 12 is a block diagram of the encoder 105 shown in FIG. 9.

FIG. 12 shows a block diagram of the encoder 105 of the second embodiment in which components corresponding to those in the encoder described above with reference to FIG. 6 are indicated by same reference characters.

In the encoder 105, the blocking circuit 401 generates the address ABL of each macro block of, preferably, 16×16 pixels, in the frame, and feeds the address to the field order re-arrangement circuit 104. The field order re-arrangement circuit 104 reads out from the field memory set 161 the macro block of pixels indicated by each macro block address ABL, and feeds the macro block of pixels as the input signal VI4 into the encoder 105. The signal VI4 passes through the blocking circuit 401, and the motion detection circuit 402 into one input of the difference detector 403.

The difference detector 403 also receives a motion-compensated macro block of pixels corresponding to each macro block of pixels in the input signal VI4. The motion-compensated macro blocks of pixels are supplied by the field memory set with motion compensation formed by the field memories 411 to 414 and the predictor 415 described above with reference to FIG. 6. The difference detector 403 determines the pixel-by-pixel differences between each macro block of pixels in the input signal VI4 and the corresponding motion-compensated macro block of pixels received from the predictor 415.

The macro blocks of motion prediction errors from the difference detector 403 are fed to the DCT circuit 404, which orthogonally transforms blocks of motion prediction errors obtained by dividing each macro block by four. The DCT circuit 404 preferably applies a discrete cosine transform (DCT) to each block. The DCT coefficients provided by the DCT circuit 404 are fed to the quantizer 405 where they are quantized using an adaptively-allocated number of bits. The quantized DCT coefficients are then fed to the variable-length coder 406, where variable-length coding such as Huffman coding, or run-length limited coding, is applied. The output of the variable-length coder 406 is fed into the encoder buffer 407, which provides the compressed output signal VC1, normally at a constant bit rate. The buffer supervisory circuit 1017, which will be described below, prevents overflow or underflow of the encoder buffer 407 by feeding the signal OVF back to the quantizer 405 to control the number of bits generated by the quantizer 405.

The quantizer 405 also feeds the quantized DCT coefficients to the field memories 411 to 414 with motion compensation via the dequantizer 408, the inverse DCT circuit 409, the adder 410, and the selector 417. The dequantizer reverses the quantizing performed by the quantizer 405, and the inverse DCT circuit 409 reverses the DCT processing performed by the DCT circuit 404. The adder 410 reconstitutes a macro block of the current picture by adding each macro block of reconstituted motion prediction errors from the inverse DCT circuit 408 to a motion-compensated macro block of a reference picture derived from one or more earlier pictures stored in the field memories 411 through 414 by the predictor 415. After the current picture has been completely reconstituted, it may then be stored in one of the field memories 411 through 414 selected by the selector 417 to serve as a reference picture for coding later pictures.

The macro blocks of the input signal VI4 are also fed to the motion detection circuit 402 which determines a motion vector for each macro block, and also generates an absolute value difference sum for each macro block. The motion detection circuit 402 feeds the absolute value difference sum to the motion prediction mode determination circuit 418.

The three available prediction modes are selected as described above with reference to FIG. 6.

In the second embodiment, the motion prediction mode determination circuit 418 supplies the prediction mode PM and the motion vector MV to the predictor 415 of the field memory set with a motion compensation, and to the read address generation circuit 1016. The read addresses generated by the address generation circuit 1016 in accordance with the prediction mode PM and the motion vector MV are supplied to the field memories 411 to 414. The address generation circuit 1016 generates field memory addresses that are offset from the pixel addresses of the current macro block by the amount specified by the motion vector MV. Macro blocks of pixels are read out from the field memories according to addresses supplied by the read address generation circuit 1016, and are supplied to the predictor 415, which performs selection and interpolation in accordance with the prediction mode PM. Thus, the field memories 411 to 414 with motion compensation and the predictor 415 perform motion compensation using the prediction mode PM and the motion vector MV.

In the second embodiment of the encoder 105 shown in FIG. 12, the picture coding type generation circuit 420 determines whether each frame should be coded using intra-frame coding (I-picture), forward prediction coding (P-picture), or bidirectional prediction coding (B-picture). The picture_coding_type signal PCT, generated by the picture coding type generation circuit 420, indicates the picture coding type for each frame. The number of pictures between successive I-pictures, between successive P-pictures, and between an I-picture and the first following P-picture may be set to predetermined values. For example, an I-picture may be provided every 15 frames, and a P-picture every 3 frames. The two frames between successive P-pictures, or between an I-picture and the first following P-picture are B-pictures. Alternatively, the number of pictures between successive I-pictures, between successive P-pictures, and between an I-picture and the first following P-picture may be signal-dependent.

The picture coding type generation circuit 420 feeds the picture_coding_type to the motion prediction mode determination circuit 418, the blocking circuit 401, the variable length coder 406 and the temporal reference generation circuit 421. The temporal reference generation circuit generates the temporal_reference signal for feeding into the variable-length coder 406. The temporal_reference signal is a signal associated with each input picture and indicates the order in which the pictures in a Group of Pictures (GOP) are to be displayed, as will be described in detail below. The temporal_reference is fed from the temporal reference generation circuit 421 to the variable length coder 406.

The variable-length coder 406 of the second embodiment will now be described. The variable-length coder 406 adds a header to the coded video signal for each picture to prepare a signal for recording on the recording medium 108. When the signal recorded in the recording medium has a frame rate of 24 Hz and is derived from a motion picture film source via a video signal with a 60 Hz field rate obtained using 2–3 pull-down, as described above, the signal can be recorded on the recording medium 108 using either of the following two recording methods.

In the first method, one or more control signals are recorded as part of the signal recorded on the recording medium to indicate which field of which frame should be repeated when the recording is reproduced to provide an output video signal with a field rate of 60 Hz. In the second method, no such control signal is recorded, and, when the recording is reproduced, the decoder performs an automatic 2–3 pull-down process to provide an output video signal with a field rate of 60 Hz.

Two variations on the first recording method, in which a flag or control signal indicates which field should be repeated, will first be described.

First Recording Method—Variation 1

The 2–3 pull-down detection circuit 102 sets the state of the field mode change signal FMC to 1 each time it detects a duplicate field in the input video signal. Accordingly, in the first variation on the first recording method, the FMC signal is used as the control signal to indicate the frames in the recording from which three fields should be generated when the recording is reproduced. In the first variation of the first recording method, the FMC signal is added to, and is recorded together with, the picture header of those frames from which three fields should be generated. The FMC signal could be recorded in the picture coding extension of the picture header (these terms will be described in more detail below).

Before the second variation on the first recording method and the second recording method are described, a description of some of the header syntax and the buffering arrangements defined in the MPEG-2 standard for the coding apparatus and the decoding apparatus will be described.

The syntax of an MPEG-2 video sequence is shown in Table 1. The mathematical operators and syntax of Table 1 are similar to those used in the C programming language. The terms used in Table 1 are defined in the working draft of ISO/IEC Recommendation H.26x for Generic Coding of

TABLE 1

| video_sequence0 { | No. of bits | Mnemonic |
|---|---|---|

```
    next_start_code0
    sequence_header0
    if (nextbits0 == extension_start_code {
        sequence_extension0
        do {
            extension_and_user_data(0)
            do {
                if (next_bits0 == group_start_code) {
                    group_of_pictures_header0
                    extension_and_user_data(1)
                }
                picture_header0
                extensions_and_user data(2)
                picture_data0
            }while ( (next_bits0 == picture_start_code) ||
                    next_bits0 == group_start_code) )
            if (nextbits0!= sequence_end_code) {
                sequence_header0
                sequence_extension0
            }
        }while (nextbits0!= sequence_end_code)
    }else {
        do {
            do {
                group_of_pictures_headers0
                if (next_bits0 == use_data_start_code)
                    user_data0
                do {
                    picture_header0
                    if (next_bits0 == user_data_start_code)
                        user_data0
```

TABLE 1-continued

| video_sequence0 { | No. of bits | Mnemonic |
|---|---|---|
|                         picture_data0 | | |
|                 }while (next_bits0 == picture_start_code) | | |
|             }while (next_bits0 == group_shirt_code) | | |
|         if (nextbits0 != sequence_end_code) | | |
|             sequence_header0 | | |
|         }while (nextbits0 != sequence_end_code) | | |
| } | | |
|     sequence_end_code | | |
| } | | |

TABLE 2

| sequence_headers { | No. or bits | Mnemonic |
|---|---|---|
|     sequence_header_code | 32 | bslbf |
|     horizontal_size_value | 12 | uimsbf |
|     vertical_size_value | 12 | uimsbf |
|     pel_aspect_ratio | 4 | uimsbf |
|     frame_rate | 4 | uimsbf |
|     bit_rate | 18 | uimsbf |
|     marker_bit | 1 | "1" |
|     vbv_buffer_size | 10 | uimsbf |
|     constrained_parameter_flag | 1 | |
|     load_intra_quantizer_matrix | 1 | |
|     if (load_intra_quantizer_matrix | | |
|         intra_quantizer_matrix[64] | 8*64 | uimsbf |
|     load_non_intra_quantizer_matrix | 1 | |
|     if (load_non_intra_quantizer_matrix | | |
|         non_intra_quantizer_matrix[64] | 8*64 | uimsbf |
|     next_start_code0 | | |

TABLE 3

| sequence_extension0 { | No. of bits | Mnemonic |
|---|---|---|
|     extension_start_code | 32 | bslbf |
|     extension_start_code_identifier | 4 | uimsbf |
|     profile_and_level_indication | 8 | uimsbf |
|     non_interfaced_sequence | 1 | uimsbf |
|     chroma_format | 2 | uimsbf |
|     horizontal_size_extension | 2 | uimsbf |
|     vertical_size_extension | 2 | uimsbf |
|     bit_rate_extension | 12 | uimsbf |
|     marker | 1 | |
|     vbv_buffer_size_extension | 5 | uimsbf |
|     frame_rate_extension | 8 | uimsbf |
|     next_start_code0 | | |
| } | | |

Moving Pictures and Associated Audio, which is incorporated herein by reference. Table 2 shows the syntax of the MPEG-2 sequence header referred to in Table 1, and Table 3 shows the syntax of the MPEG-2 sequence extension referred to in Table 1.

The frame_rate field of the sequence header shown in Table 2 is 4 bits long and defines the frame rate of the video signal in the video sequence. The possible states of the frame rate field are shown in Table 4.

TABLE 4

| frame_rate | frames per second |
|---|---|
| 0000 | forbidden |
| 0001 | 23.976 |
| 0010 | 24 |
| 0011 | 25 |
| 0100 | 29.97 |

TABLE 4-continued

| frame_rate | frames per second |
|---|---|
| 0101 | 30 |
| 0110 | 50 |
| 0111 | 59.94 |
| 1000 | 60 |
| . . . | reserved |
| 1111 | reserved |

Included in the sequence extension shown in Table 3 is the non_interlaced_sequence flag, the state of which indicates whether the video signal in the video sequence is interlaced or progressive (i.e., non-interlaced). The non_interlaced_sequence flag is set to its 1 state when the video sequence contains only progressive pictures, otherwise, the non_interlaced_sequence flag is set to its 0 state. When the non_interlaced_sequence is in its 0 state, the frame_rate represents the number of frames per second of the intended display sequence. When the non_interlaced_sequence is in its 1 state, the frame_rate specifies the number of non-interlaced frames per second, and, consequently, the number of progressive pictures per second.

The sequence header shown in Table 2 and the sequence extension shown in Table 3 also include the vbv_buffer_size field and the vbv_buffer_size_extension field, respectively. The contents of the vbv_buffer_size field and the vbv_buffer_size_extension field together provide data from which the size B of the VBV buffer can be calculated, as will be described below. The Video Buffering Verifier (VBV) is a hypothetical decoder which is conceptually connected to the output of the coding apparatus. The VBV includes a hypothetical buffer having a size defined by the VBV buffer size. The output signal of the encoder is fed into the VBV buffer at the constant bit rate being used. Signal is removed from the VBV buffer according to rules that will be set forth in detail below. It is a requirement of an MPEG coding apparatus that the bit stream that it produces shall not cause the VBV buffer to either overflow or underflow. Thus, the VBV buffer size B defines the minimum buffer size required to decode the output signal generated by the coding apparatus. More information on the VBV is set forth in Annex C of the working draft of ISO/IEC Recommendation H.26x.

The ten least significant bits of the vbv_buffer_size are located in the vbv_buffer_size field of the sequence header shown in Table 2. The five most significant bits of the vbv_buffer_size are located in the vbv_buffer_size_extension field in the sequence extension shown in Table 3. The five bits from the vbv_buffer_size extension field are combined with the ten bits from the vbv_buffer_size field to generate a 15-bit integer called vbv_buffer_size. The size B of the VBV buffer is then calculated from the vbv_buffer_size as follows:

$B=16\times 1,024\times vbv\_buffer\_size$

In the video sequence defined above in Table 1, a picture header and a picture coding extension, each including several fields, precede the video signal of each picture. The syntax of the picture header and of the picture coding extension is shown Table 5 and Table 6, respectively.

TABLE 5

| picture_header0 } | No. of bits | Mnemonic |
|---|---|---|
| picture_start_code | 32 | bslbf |
| temporal_reference | 10 | uimsbf |
| picture_coding_type | 3 | uimsbf |
| vbv_delay | 16 | uimsbf |
| if (picture_coding_type == 2 \|\| picture_coding_type == 3) { | | |
| full_pel_forward_vector | 1 | |
| forward_f_code | 3 | uimsbf |
| } | | |
| if (picture_coding_type == 3 { | | |
| full_pel_backward_vector | 1 | |
| backward_f_code | 3 | uimsbf |
| } | | |
| while (nextbits0 == '1') { | | |
| extra_bit_picture | 1 | "1" |
| extra_information_picture | 8 | |
| } | | |
| extra_bit_picture | 1 | "0" |
| next_start_code0 | | |
| } | | |

A number of the fields in the picture header shown in Table 5 will now be described.

The temporal_reference field is a 10-bit field, the contents of which indicate the display order of the picture to which the picture header belongs (the order of the pictures in the video sequence is not the same as the order in which the pictures will be displayed). A picture counter is incremented by one for each input picture to provide the temporal_reference. The temporal_reference counter is reset to zero for the first picture of each group of pictures, or if it reaches 1024. When a frame is coded as two fields, the temporal_reference is the same for both fields. The picture_coding_type code is a 3-bit field, the contents of which identify how the picture to which the picture header belongs has been coded,

TABLE 6

| picture_coding_extension0{ | No of bits | Mnemonic |
|---|---|---|
| extension_start_code | 32 | bslbf |
| extension_id | 4 | uimsbf |
| forward_horizontal_f_code | 4 | uimsbf |
| forward_vertical_f_code | 4 | uimsbf |
| backward_horizontal_f_code | 4 | uimsbf |
| backward_vertical_f_code | 4 | uimsbf |
| intra_dc_precision | 2 | uimsbf |
| picture_structure | 2 | uimsbf |
| top_field_first | 1 | uimsbf |
| frame_pred_frame_dct | 1 | uimsbf |
| concealment motion vectors | 1 | uimsbf |
| q_scale_type | 1 | uimsbf |
| intra_vlc_format | 1 | uimsbf |
| alternate_scan | 1 | uimsbf |
| number_of_field_displayed_code | 1 | uimsbf |
| chroma_postprocessing_type | 1 | uimsbf |
| non_interlaced_frame | 1 | uimsbf |
| composite_display_flag | 1 | uimsbf |
| if (composite_display_flag { | | |
| v-axis | 1 | uimsbf |
| field_sequence | 3 | uimsbf |

TABLE 6-continued

| picture_coding_extension0{ | No of bits | Mnemonic |
|---|---|---|
| sub_carrier | 1 | uimsbf |
| burst_amplitude | 7 | uimsbf |

TABLE 6-continued

| picture_coding_extension0{ | No of bits | Mnemonic |
|---|---|---|
| sub_carrier_phase | 8 | uimsbf |
| } | | |
| next_start_code0 | | |
| } | | | i.e., whether the picture has been coded using intra-picture coding (I-picture), prediction coding (P-picture), or bidirectional prediction coding (B-picture), or whether only the DC components resulting from intra-picture coding have been coded (D-picture). The possible states of the picture_coding_type field are shown in Table 7. No D-picture may in a video sequence together with a picture of any other type.

TABLE 7

| picture_coding_type | coding method |
|---|---|
| 000 | forbidden |
| 001 | intra-coded (I) |
| 010 | predictive-coded (P) |
| 011 | bidirectionally-predictive-coded (B) |
| 100 | dc intra-coded (D) |
| 101 | reserved |
| 110 | reserved |
| 111 | reserved |

The vbv_delay field is a 16-bit field, the contents of which are used when the encoder provides an output signal with a constant bit rate. The vbv_delay defines the initial occupancy of the decoder buffer at the start of decoding to prevent the decoder buffer from underflowing or overflowing. The vbv_delay is defined in terms of the time required to fill the VBV buffer at the target bit rate R from an initially empty state to the desired initial occupancy before the video signal of the current picture is removed from the buffer. The vbv_delay is the number of cycles of the 90 kHz system clock that the VBV should wait after receiving the final byte of the picture_start_code in the picture header. The vbv_delay may be calculated from the state of the VBV buffer as follows:

$$vbv\_delay_n = 90,000 \times B_n^* / R$$

In the above equation:

n>0, $B_n^*$ is the VBV buffer occupancy immediately before removing the video signal of the picture n from the buffer but after removing any COP layer and sequence header preceding the picture n, and R is the bit rate indicated by bit_rate in the sequence header.

A number of the fields of the picture coding extension shown in Table 6 will now be described.

The picture_structure field is a 2-bit field, the contents of which indicate whether the picture is a frame picture, or, otherwise, whether the picture is the top field or the bottom field of a frame consisting of two fields. The possible states of the picture_structure field are shown in Table 8.

TABLE 8

| picture_structure | Meaning |
| --- | --- |
| 11 | Frame-Picture |
| 01 | Top Field |
| 10 | Bottom Field |
| 00 | reserved |

The significance of the state of the top_field_first flag depends upon the picture structure indicated in the picture_structure field. When the frame_structure indicates that the picture is a frame picture, the top_field_first flag in its 1 state indicates that the top field of the frame is to be displayed first. On the other hand, the top_field_first in its 0 state indicates that the bottom field of the frame is to be displayed first. In a field structure picture, or in a progressive frame-structure picture in which the non_interlaced_sequence flag is set to its 1 state, the top_field_first flag is always set to its 0 state.

The number_of_field_displayed_code flag that indicates the number of fields in which the picture is to be displayed. When the flag is set to its 1 state, the picture is to be displayed as three fields. When the flag is set to its 0 state, the picture is to be displayed as two fields. If the picture is a progressive picture for which the picture_structure code is 11 and the non_interlaced_sequence flag is in its 1 state, the number_of_field_displayed_code flag must be set to its 0 state. A frame consisting of field pictures is always displayed in two fields.

Control of the encoder buffer by the buffer supervisory circuit 1017 will now be described with reference to FIGS. 13, 14 and 15.

First, referring to FIG. 15, the buffer supervisory circuit 1017 of the second embodiment controls bit allocation in the variable-length coder 406 to prevent the decoder buffer 804 (corresponding to the buffer 701 in the decoder shown in FIG. 16) from overflowing or underflowing when the output signal generated by the coding apparatus is decoded. The buffer supervisory circuit operates by hypothetically connecting the above-mentioned hypothetical video buffering verifier (VBV) buffer 811 to the output of the coding apparatus. The output signal generated by the coding apparatus is fed into the hypothetical VBV buffer 811. The video signal of each picture stored in the hypothetical VBV buffer is read out of the VBV buffer in accordance with the rules set forth below, and in response to the contents of the vbv_delay field. The buffer supervisory circuit 1017 monitors the state of the hypothetical buffer 811 and controls bit allocation in the variable-length coder to prevent the hypothetical VBV buffer from overflowing or underflowing.

The buffer supervisory circuit controls the variable-length coder video bit stream so that the output signal of the coding apparatus satisfies the following video buffering verifier requirements:

(1) The VBV and the coding apparatus have the same clock frequency and the same picture rate, and are operated synchronously.

(2) The VBV has a VBV buffer of size B, where B is calculated as described above from the vbv_buffer_size in the sequence header and the vbv_buffer_size_extension in the sequence header extension.

(3) The VBV is initially empty, and is filled with the output signal from the coding apparatus for the time specified by the vbv_delay in the picture header.

(4) All of the video signal for the picture that has been in the VBV buffer the longest is removed instantaneously. Then, after a time t calculated from the picture_rate in the sequence header, the picture_structure in the picture coding extension, and the number_of_field_displayed_code in the picture header of the last picture decoded, all of the video signal for the picture which, at that time, has been stored in the buffer longest is instantaneously removed. The period of time t is defined as follows:

$$t = field\_count / (field\_per\_picture \times P)$$

Where:

field_per_picture=2 when the picture_structure=11, i.e., in the case of a frame structure, or field_per_picture=1 when the picture_structure has a value different from 11;

P=the number of pictures per second calculated from the picture_rate; and field_count is the number of displayed fields calculated from the number_of_fields_displayed_code flag in the picture header of the last picture displayed.

The sequence header and the GOP header immediately preceding a picture are removed simultaneously with the picture. The VBV is checked immediately before any data or signal are removed. Each time the VBV buffer is checked, its occupancy must lie between 0 and B bits, where B is the VBV buffer size in bits calculated from the vbv_buffer_size and the vbv_buffer_size extension as described above.

The second variation of the first recording method and the second recording method will now be described.

First Recording Method—Second Variation

The MPEG-2 syntax makes no official allocation of a field in the picture header for storing the FMC signal required by the first variation on the first recording method. Thus, the second variation on the first recording method uses control signals and flags that conform to the official MPEG-2 syntax to indicate which fields of which frames of the recorded signal should be duplicated when the recording is reproduced as an interlaced video signal with a 60 Hz field rate. In the MPEG-2 syntax, the non_interlaced_sequence flag, indicating whether or not that all the pictures in the video sequence are non-interlaced pictures, and the frame_rate field, the contents of which indicate the picture rate, are fields in the sequence header that begins each video sequence. In the second variation of the first recording method, the variable length coder 406 sets the frame_rate to 24 Hz or 23.976 Hz, and sets the non_interlaced_sequence to 0.

The second variation on the first recording method uses the flags DSO (top_field_first) and DFN (number_of_field_displayed_code) provided by the rate conversion circuit 103 as flags to indicate which field should be repeated in the decoding apparatus output signal VO. The rate conversion circuit 103 feeds the flags DSO and DFN to the variable-rate coder 406 where they are entered into the fields allocated by the MPEG-2 standard in each picture header in the video sequence. In the picture header, the flag DSO in its 1 state indicates that the first field of the picture is to be displayed first, whereas the flag DSO in its 0 state indicates that the second field of the picture is to be displayed first. Additionally, the flag DFN in its 0 state indicates that the picture is to be displayed as two fields, whereas the flag DFN in its 1 state indicates that the picture is to be displayed as three fields.

Second Recording Method

The second recording method, which provides a signal that the decoding apparatus decodes by automatically performing 2-3 pull-down, will now be described.

The second recording method sets the non_interlaced_sequence flag to its 1 state, and the frame_rate to 24 Hz or 23.976 Hz. Because of the state of the non_interlaced_sequence flag, the top_field_first flag is always set to 0. Additionally, the number_of_field_displayed_code flag is set to 0. No signals are included in the encoder output signal to indicate which fields are to be duplicated in the decoder. When the rate conversion circuit in the decoder recognizes this combination of the non_interlaced_sequence flag and the frame_rate, it automatically performs 2-3 pull-down, as will be described below.

The effect of the second recording method, in which the decoding apparatus automatically performs 2-3 pull-down, on the bit rate of the output signal from the encoder will now be described.

The second recording method does not control the state of the number_of_field_displayed_code flag in the picture header, and the decoding apparatus 101 automatically performs 2-3 pull-down to provide a decoding apparatus output signal with a 60 Hz field rate for display. As a result of this, as shown in FIG. 13, since the output signal of the encoder includes a different number of pictures per second from the number of pictures per second in the output signal of the decoder, the requirements for the VBV buffer set forth above are not satisfied. Hence, if the buffer supervisory circuit 1017 controls the quantizer 405 in the coding apparatus 100 based on the assumption that the coding apparatus is feeding the VBV buffer, an overflow or an underflow may possibly occur in the actual buffer in the decoding apparatus 101. Accordingly, when the second recording method is used, countermeasures to prevent possible overflow or underflow of the buffer in the decoding apparatus must be taken in the encoder 105.

The requirements for using the second recording method are:

(1) The VBV buffer size B must be calculated using a vbv_buffer_size obtained by multiplying the vbv_buffer_size in the sequence header and the sequence extension by 4/5 (4/5 corresponds to the ratio of the frame rate between the coding apparatus and the decoding apparatus).

(2) A vbv_delay must be chosen by considering both the case in which the video signal of the first frame of a video sequence is displayed as three fields and the case in which the video signal of the first frame is displayed as two fields.

Figure 13:
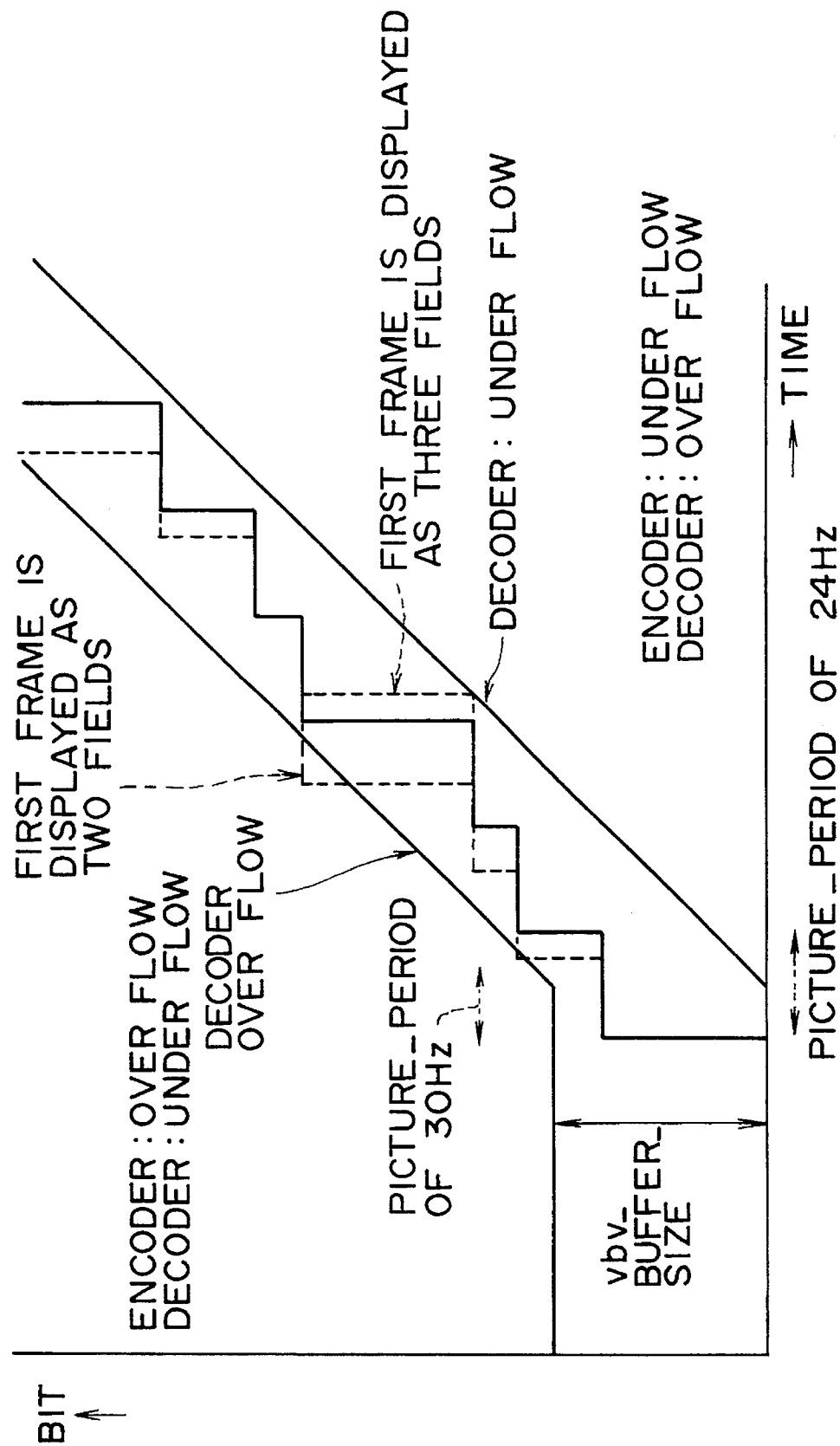
FIG. 13 is a graph showing the state of the encoder buffer 407 in the encoder 105 shown in FIG. 12 and of the decoder buffer 701 in the decoder 112 shown in FIG. 16.
Figure 14:
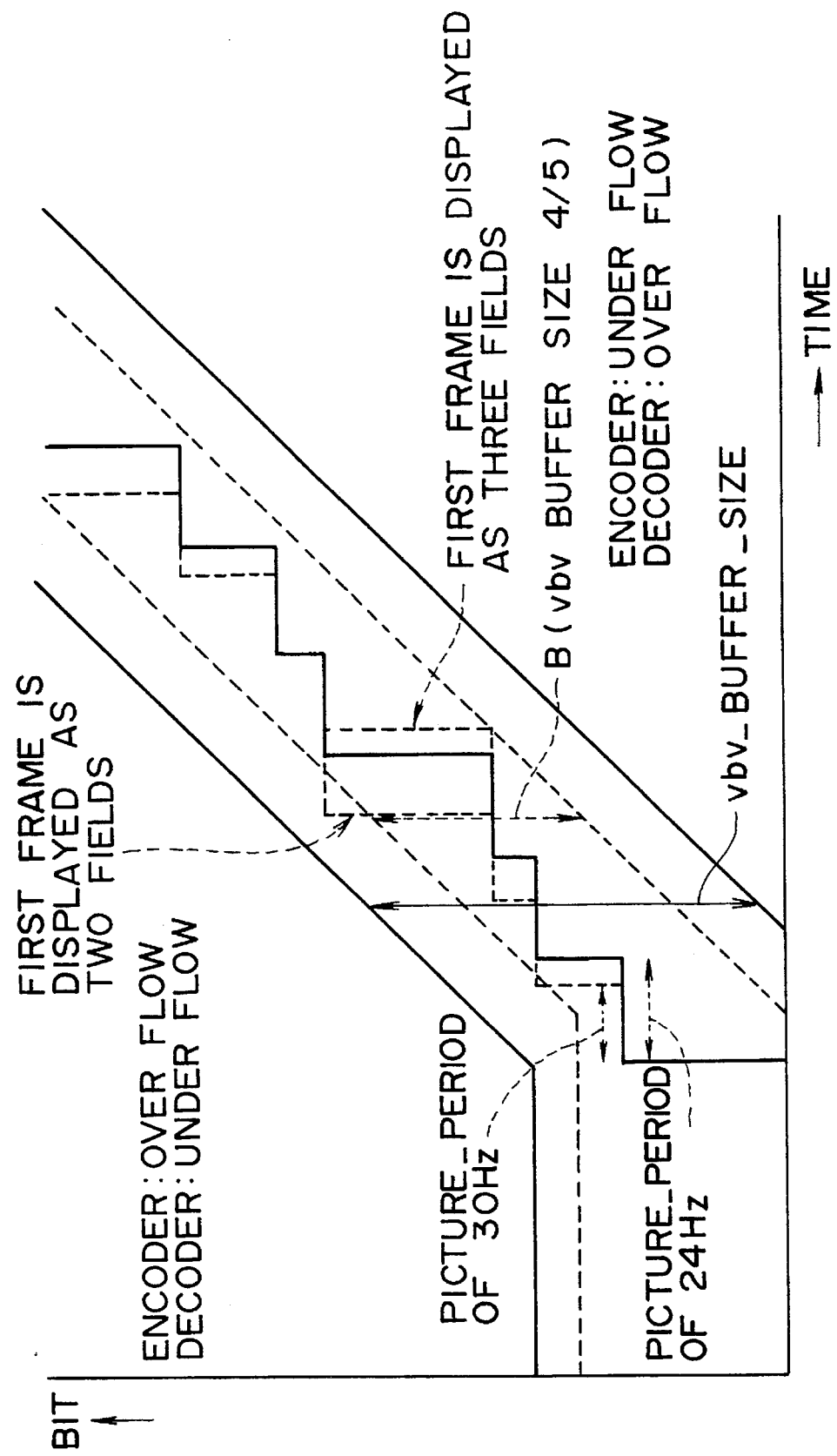
FIG. 14 is a graph showing the state of the encoder buffer 407 in the encoder 105 shown in FIG. 12 and of the decoder buffer 701 in the decoder 112 shown in FIG. 9.

FIGS. 13 and 14 will now be described. The distance between the solid sloped parallel lines in each figure represents the buffer size. The inclination of the parallel lines in each figure represents the bit rate of the output signal of the coding apparatus or the input signal of the decoding apparatus. The solid stepped line in each figure shows how the encoder 801 transfers the video signal of each picture into the encoder buffer 802. As described above, all of the video signal for each picture is deposited instantaneously into the encoder buffer at each picture period of 24 Hz. The broken stepped lines in each figure show how the decoder 805 withdraws the video signal for each frame from the decoder buffer 804. As described above, after the delay time defined by the vbv_delay, all of the video signal for each picture is withdrawn instantaneously from the decoder buffer at each picture period of 30 Hz. The buffer supervisory circuit 1017 ensures that each solid stepped line is maintained within the associated parallel lines.

When the second recording method is used, the distance between the broken lines in FIG. 14 represents a buffer capacity B' (calculated from vbv_buffer_size ×4/5). In this instance, buffer control is performed so that the centers of areas bounded by the sloped parallel broken lines and the sloped parallel solid lines coincide with each other.

In this manner, by causing the buffer supervisory circuit 1017 to reduce the size of the VBV buffer compared with the capacity of the actual decoder buffer, the second recording method can be used without the risk of overflow or underflow in the decoder buffer. However, the reduction in the size of the VBV buffer may result in fewer bits being allocated to some pictures than if bits were allocated based on the VBV buffer having its full size. This may result in some impairment of the picture quality.

Figure 16:
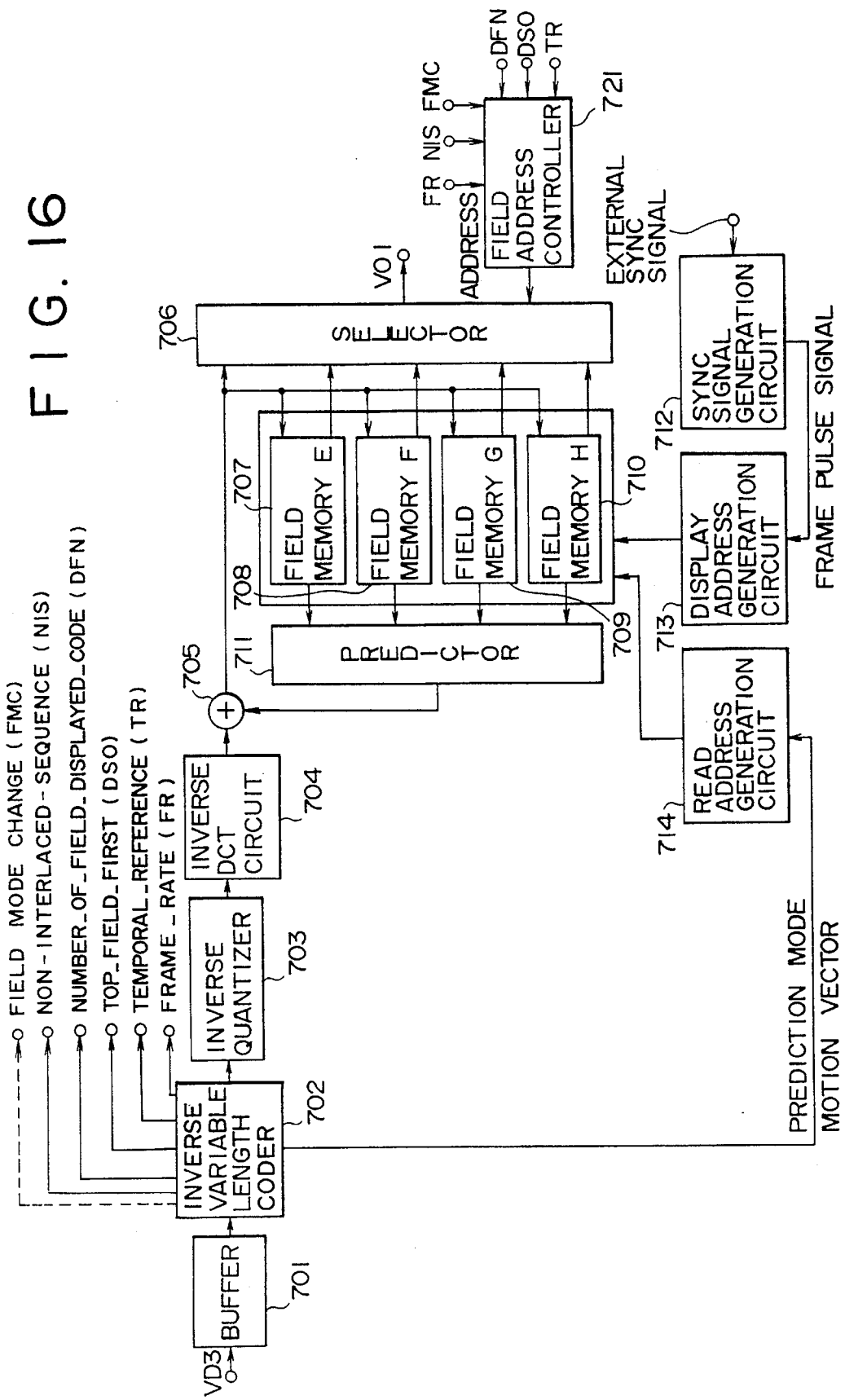
FIG. 16 is a block diagram of the decoder 112 and the rate conversion circuit 113 shown in FIG. 9.

The decoder 112 of the second embodiment will now be described with reference to the block diagram shown in FIG. 16. Components in FIG. 16 that correspond to components in the decoder shown in FIG. 8 described above are indicated by the same reference characters. The input signal VD3 from the ECC decoder circuit 111 is temporarily stored in the decoder buffer 701, as described above. From the decoder buffer 701, the input signal passes through the variable length decoder 702, where at least one control signal is extracted from the various headers in the input signal VD3, as will be described below. The variable length decoder also reverses the variable length coding of the DCT coefficients carried out in the variable-length coder 406 in the coding apparatus.

Then, each block of quantized DCT coefficients in the signal from the variable-length decoder is dequantized by the dequantizer 703 using information extracted from the input signal VD3 by the variable length decoder 702. Each resulting block of DCT coefficients is then orthogonally transformed by the inverse DCT circuit 704, which preferably applies an inverse DCT. The dequantizer 703 and the inverse DCT circuit 704 are constructed to have characteristics that are complementary to those of the quantizer 405 and the DCT circuit 404, respectively, of the encoder shown in FIG. 12.

Each macro block of motion prediction errors from the output of the DCT circuit 704 is fed to the adder 705 where it is combined with a macro block derived from one or more reference pictures by the predictor 711 to regenerate a macro block of the current picture. The resulting macro block of the current picture is fed into one of the field memories 707 through 710 in accordance with an address from the display address generation circuit 713. Fully reconstructed pictures stored in the field memories 707 through 710 are read out with appropriate timing by the display address generation circuit 713 to the selector 706, which provides the read out picture as part of the decoder output signal VO1.

The variable-length decoder 702 also extracts from headers in the input signal VD3 the various control signals described above which it feeds to the field address generation circuit 721. When signal reproduced from the recording medium 109 was recorded using the first recording method, and the control signals indicate that a field was removed from the coder input signal, this causes the field address generation circuit 721 to read out once more from one of the field memories 707 through 710 the reconstructed picture that was read out two pictures earlier. The repeated read out picture is fed to the selector 706, which provides the read out picture as part of the decoding apparatus output signal VO. In this way, the control signal causes the decoder to repeat a decoded field to reconstitute each field that was removed from the coder input signal.

The rate conversion circuit 113 of the second embodiment of the decoding apparatus shown in FIG. 9 will now be described with reference to FIG. 16.

In the rate conversion circuit 113, the field address controller 721 receives one or more control signals extracted from the input signal VD3 to the decoder 112 by the variable-length decoder 702, i.e., the field address controller receives either the FMC signal or the non_interlaced_ sequence flag, frame_rate, top_field_first flag, and number_of_ field_displayed_code flag. The field address generator 721 provides addresses to the selector 706 to cause the selector to feed the video signals of the reconstituted pictures stored in the field memory set 707 through 710 to the decoding apparatus output signal VO.

The field address generator 721 also receives the temporal_reference signal from the variable-rate decoder 702, which enables the field address generator 721 to control the selector 706 so that the order of the fields in the decoding apparatus output signal VO is the same as that of the coder input signal VI.

Figure 17:
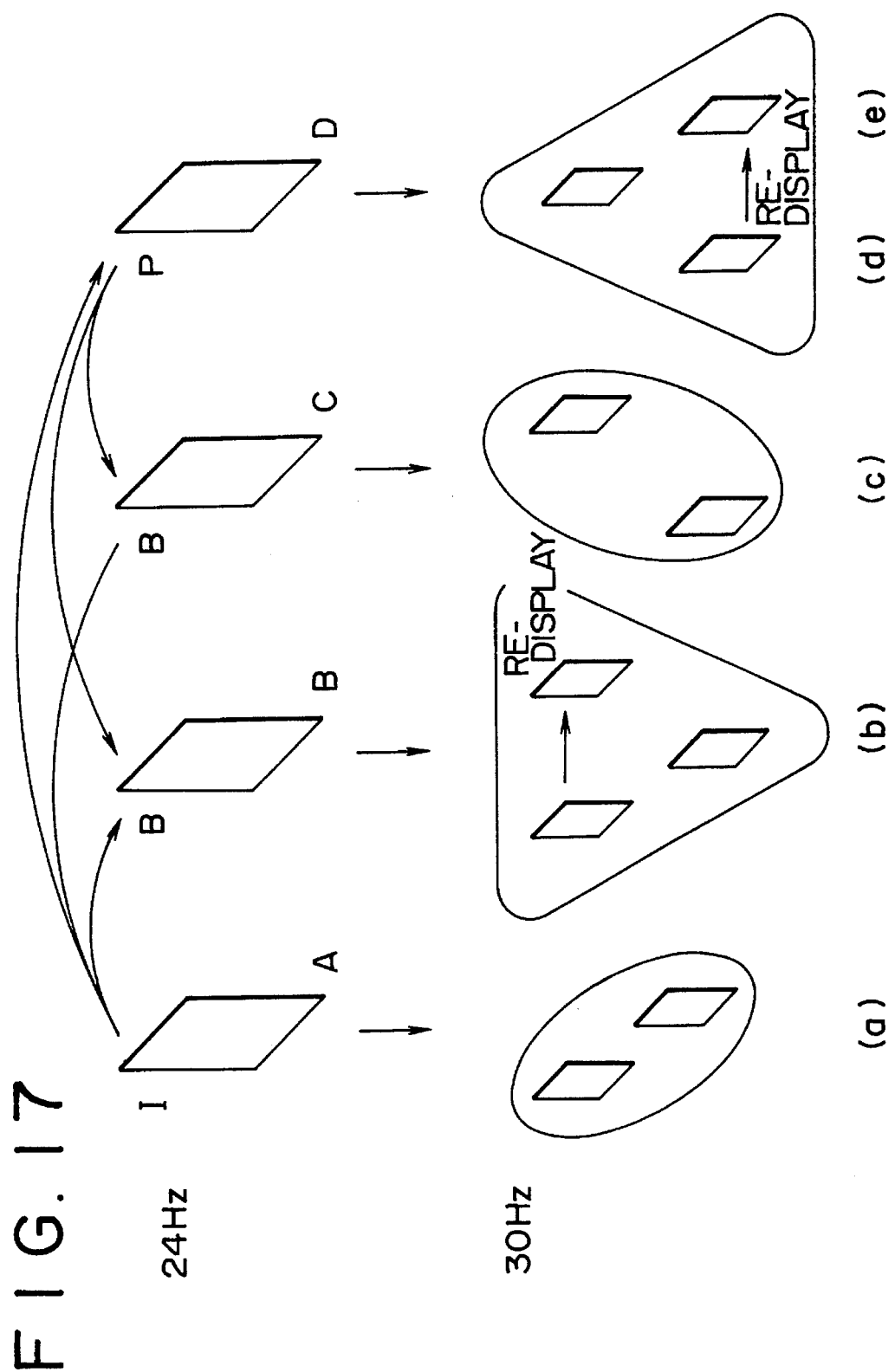
FIG. 17 illustrates how the decoding apparatus derives a video signal with a field rate of 60 Hz from a recorded signal with a frame rate of 24 Hz recorded according to the first variation of the first recording method.

When the signal recorded on the recording medium 109 was recorded using the first variation of the first recording method described, the variable-rate decoder 702 extracts the field mode change signal FMC from the picture header and feeds it to the rate conversion circuit 113 as the control signal. For those frames for which the FMC signal is in its 1 state, the field address generator 721 causes the selector 706 to feed the video signal of the first field of the frame from one of the field memories 707 through 710 to the decoder apparatus output signal a second time, so that the frame provides three fields of the decoder apparatus output signal VO. Otherwise, the field address generator causes the selector 706 to provide two fields of the decoding apparatus output signal VO from the frame. When the FMC of the first frame in a sequence is in the 0 state, two fields are derived from the frame as shown for the frame A in FIG. 17. But when the FMC of the first frame in the sequence is in the 1 state, the three fields are derived from the frame, as shown for the frame B of FIG. 17.

When the signal recorded on the recording medium 109 is in accordance with the MPEG-2 standard, the signal may have been recorded using the second variation on the first recording method or using the second recording method. The variable-rate decoder 702 extracts the non_interlaced_ sequence, the frame_rate, the top_field_first flag, the number_of_field_displayed_code flag, and the temporal_reference from the picture header, and feeds these control signals to the field address generator 721.

When the non_interlaced_sequence is 1 and the frame_ rate is 24 Hz or 23.976 Hz, this indicates that the signal recorded on the recording medium 109 was recorded using second variation of the first recording method. Accordingly, the field address generating circuit 721 examines the state of the top_field_first flag and the state of the number_of_ field_displayed_code flag to determine which field of which frame should duplicated in the decoding apparatus output signal VO.

Figure 18:
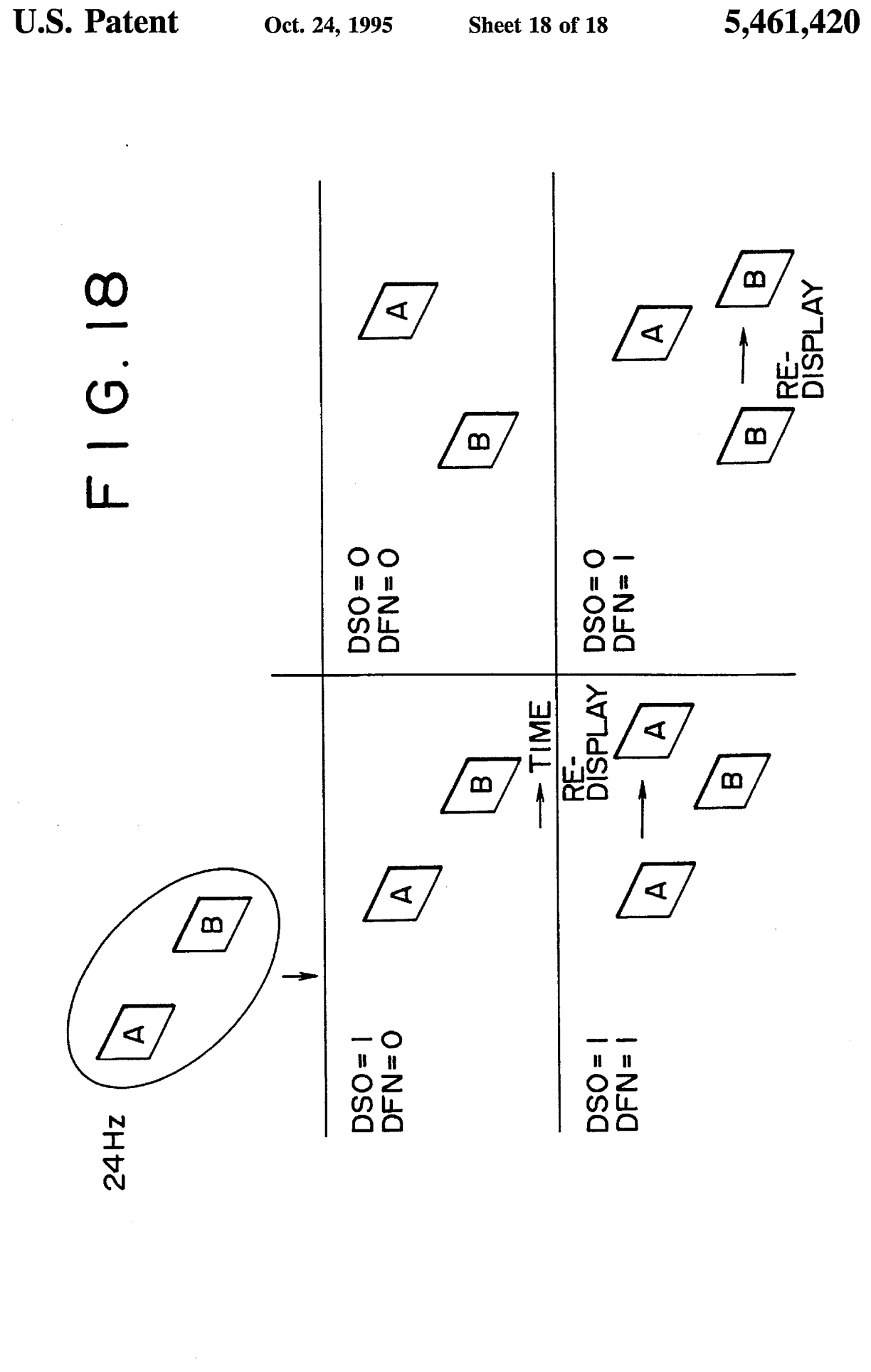

FIG. 18 illustrates how the two flag signals extracted from the picture header of each picture in the signal with the 24 Hz frame rate reproduced from the recording medium 109 control the generation of the decoding apparatus output signal with a 60 Hz field rate. When the top_field_first flag (DSO) extracted from the picture header is in its 1 state, and the number_of_field_displayed_code flag extracted from the picture header is in its 0 state, the field address generator 721 causes the selector 706 to provide two fields of the decoding apparatus output signal VO from the picture signal following the picture header. The order in which the selector reads selected ones of the field memories 707 through 710 is such that the first field of the output signal corresponds to the top field of the picture signal.

When the top_field_first flag (DSO) is in its 1 state, and the number_of_field_displayed_code flag is in its 1 state, the field address generator 721 causes the selector 706 to provide three fields of the decoding apparatus output signal VO from the picture signal following the picture header. The order in which the selector reads selected ones of the field memories 707 through 710 is such that the first and third fields of the output signal correspond to the top field of the picture signal.

When the top_field_first flag (DSO) is in its 0 state, and the number_of_field_displayed_code flag is in its 0 state, the field address generator 721 causes the selector 706 to provide two fields of the decoding apparatus output signal VO from the picture signal following the picture header. However, the order in which the selector reads selected ones of the field memories 707 through 710 is such that the first field of the output signal corresponds to the bottom field of the picture signal.

Finally, when the top_field_first flag (DSO) is in its 0 state, and the number_of_field_displayed_code flag is in its 1 state, the field address generator 721 causes the selector 706 to provide three fields of the decoding apparatus output signal VO from the picture signal following the picture header. The order in which the selector reads selected ones of the field memories 707 through 710 is such that the first and third fields of the output signal correspond to the bottom field of the picture signal.

When the state of the non_interlace_sequence flag is 0 and the frame_rate is 24 Hz or 23.976 Hz, this indicates to the field address generator 721 that the signal recorded on the recording medium 109 was recorded using the second recording method. In this instance, top_field_first flag (DSO) remains constantly in its 0 state, and the number_ of_field_displayed_code flag also remains constantly in its 0 state. In response to this combination of control signals, the field address generator generates an address sequence that causes the selector 706 to perform 2–3 pull-down without reference to any control signals originating in the encoder. When the field address generator causes the selector to feed one field of alternate frames to the decoding apparatus output signal VO to perform 2–3 pull-down, the duplicated fields in the decoding apparatus output signal VO may or may not be the same fields as the duplicate fields in the coder input signal VI.

Finally, the video signal recordings 108 or 109 made by or reproduced by the embodiments of the present invention at least include, as data relating to removal of a duplicated field, a field mode change signal (FMC) or telecine conversion rate information (non_interlaced_sequence and frame_rate). Pictures from which duplicated fields were removed may be identified using the field mode change signal or by the number_of_field_displayed_code flag. Identifying such pictures avoids the need to reduce the size of the VBV buffer to prevent overflow or underflow of the decoder buffer.

The recordings may be made on such recording media as, for example, disk-shaped recording media (optical disks, recordable optical disks, hard disks and so forth), tape-based recording media, semiconductor memories, IC cards and so forth. Moreover, the signal generated by the coding apparatus may be transmitted as a broadcast signal, or via a distribution system such as a cable system or telephone network.

We claim:

1. A method for generating a coded video signal by coding an input video signal with a field rate of 60 Hz derived from a motion picture film source using 2–3 pulldown, the method comprising steps of:

detecting duplicate fields in the input video signal;

generating a control signal having a state indicating each of the detected duplicated fields;

in response to the state of the control signal, eliminating from the input video signal the duplicate fields detected in the detecting step;

generating a progressive video signal from the fields of the input video signal remaining following elimination of the duplicate fields in the eliminating step, the progressive video signal being composed of frames and having a frame rate of 24 Hz, the frames of the progressive video signal including lost-field frames generated from fields of the input video signal that were duplicates of the duplicate fields eliminated in the eliminating step;

coding the frames of the progressive video signal to produce respective frames of the coded video signal, the frames of the progressive video signal being coded with different numbers of bits; and including the control signal in each of the frames of the coded video signal, the state of the control signal indicating the frames of the coded video signal resulting from coding the lost-field frames of the progressive video signal.

2. The method of claim 1, wherein the coding step comprises steps of:

orthogonally transforming ones of the frames of the progressive video signal to produce respective sets of transform coefficients;

locally decoding the sets of transform coefficients using an inverse orthogonal transform to produce locally-decoded picture; and applying predictive coding to ones of the frames of the progressive video signal using, for each of the ones of the frames of the progressive video signal, a selected one of the locally-decoded pictures as a reference picture.

3. The method of claim 1, wherein the method is for providing a recording signal for recording on a recording medium and additionally comprises the steps of:

deriving a recording signal from the coded video signal; and recording the recording signal on the recording medium.

4. The method of claim 1, wherein:

the step of coding the frames of the progressive video signal to produce respective frames of the coded video signal includes a step of adding a picture header to each of the frames of the coded video signal; and in the step of including the control signal in each of the frames of the coded video signal, the control signal is included in the picture header of each of the frames.

5. The method of claim 4, wherein, in the step of including the control signal in each of the frames of the coded video signal, in lieu of including the control signal in each of the frames of the coded video signal, the control signal is included in the picture header of only the frames resulting from coding the lost-field frames of the progressive video signal.

6. A method of decoding a coded video signal to provide an interlaced output video signal with a field rate of 60 Hz, the coded video signal including frames derived by coding respective frames of a progressive video signal having a frame rate of 24 Hz, the progressive video signal being derived from an interlaced input video signal with a field rate of 60 Hz by eliminating duplicate fields, the frames of the coded video signal including a control signal having a state indicating the frames of the coded video signal resulting from coding lost-field frames of the progressive video signal, lost-field frames being frames of the progressive video signal wherefrom a duplicate field was eliminated, the method comprising steps of:

extracting the control signal from the frames of the coded video signal;

decoding the frames of the coded video signal to provide respective frames of a reconstructed progressive video signal; and in response to the control signal extracted from each one of the frames of the coded video signal, deriving three fields of the interlaced output video signal from the respective one of the frames of the reconstructed progressive video signal when the control signal indicates that the one of the frames of the coded video signal resulted from coding one of the lost-field frames, and deriving two fields of the interlaced output video signal from all others of the frames of the reconstructed progressive video signal.

7. The method of claim 6, wherein: the control signal is included only in the frames of the coded video signal respectively derived from the lost-field frames of the progressive video signal; and in the deriving step, three fields of the interlaced output video signal are derived from those frames of the reconstructed progressive video signal resulting from decoding the frames of the coded video signal wherefrom the control signal was extracted in the extracting step.

8. The method of claim 6, wherein:

frames of the coded video signal include respective sets of transform coefficients; and the decoding step includes the steps of:
   providing a reference picture,
   deriving the sets of transform coefficients from the coded video signal,
   applying an inverse orthogonal transform to the sets of transform coefficients to provide respective sets of motion prediction errors, and reconstructing one of the frames of the reconstructed progressive video signal from the reference picture and one of the sets of motion prediction errors.

9. Apparatus for generating a coded video signal by coding an input video signal with a field rate of 60 Hz derived from a motion picture film source using 2–3 pulldown, the apparatus comprising:

detecting means for detecting duplicate fields in the input video signal;

control signal generating means for generating a control signal having a state indicating each of the detected duplicated fields;

eliminating means, operating in response to the state of the control signal, for eliminating the duplicate fields from the input video signal;

generating means, operating on the input video signal following elimination of the duplicate fields by the eliminating means, for generating a progressive video signal composed of frames and having a frame rate of 24 Hz, the frames of the progressive video signal including lost-field frames generated from fields of the input video signal that were duplicates of the duplicate fields eliminated by the eliminating means; and coding means for coding the frames of the progressive video signal to produce respective frames of the coded video signal; and multiplexing means for including the control signal in each of the frames of the coded video signal, the state of the control signal indicating the frames of the coded video signal resulting from coding the lost-field frames of the progressive video signal.

10. The apparatus of claim 9, wherein the coding means comprises:

transform means for orthogonally transforming frames of the progressive video signal to produce respective sets of transform coefficients;

decoding means for locally decoding the sets of transform coefficients using an inverse orthogonal transform to produce locally-decoded pictures; and means for applying predictive coding to ones of the frames of the progressive video signal using, for each of the ones of the frames of the progressive video signal, a selected one of the locally-decoded pictures as a reference picture.

11. The apparatus of claim 9, additionally for providing a recording signal for recording on a recording medium, and additionally comprising:

means for deriving a recording signal from the coded video signal; and means for recording the recording signal on the recording medium.

12. The apparatus of claim 9, wherein the coding means is additionally for adding a picture header to each of the frames of the coded video signal, and for including the control signal in the picture header of each of the frames.

13. The apparatus of claim 12, wherein, in lieu of including the control signal in the picture header of each of the frames of the coded video signal, the coding means includes the control signal in the picture header of only the frames resulting from coding the lost-field frames of the progressive video signal.

14. Apparatus for decoding a coded video signal to provide an interlaced output video signal with a field rate of 60 Hz, the coded video signal including frames derived by coding respective frames of a progressive video signal having a frame rate of 24 Hz, the progressive video signal being derived from an interlaced input video signal with a field rate of 60 Hz by eliminating duplicate fields, the frames of the coded video signal including a control signal having a state indicating the frames of the coded video signal resulting from coding lost-field frames of the progressive video signal, the lost-field frames being frames of the progressive video signal wherefrom a duplicate field was eliminated, the apparatus comprising:

decoding means for decoding the frames of the coded video signal to provide respective frames of a reconstructed progressive video signal;

extracting means for extracting the control signal from the frames of the coded video signal; and field deriving means, operating in response to the control signal extracted from each one of the frames of the coded video signal, for deriving three fields of the interlaced output video signal from the respective one of the frames of the reconstructed progressive video signal when the state of the control signal indicates that the one of the frames of the coded video signal resulted from coding one of the lost-field frames, and deriving two fields of the interlaced output video signal from all others of the frames of the reconstructed progressive video signal.

15. The apparatus of claim 14, wherein:

in lieu of including the control signal in each of the frames of the coded video signal, the control signal is included only in the frames of the coded video signal derived from lost-field frames; and the deriving means derives three fields of the interlaced output video signal from those frames of the reconstructed progressive video signal resulting from decoding the frames of the coded video signal wherefrom the control signal is extracted by the extracting means.

16. The apparatus of claim 14, wherein:

frames of the coded video signal include respective sets of transform coefficients; and the decoding means includes:

means for deriving the sets of transform coefficients from the coded video signal, inverse transform means for applying an inverse orthogonal transform to the sets of transform coefficients to provide respective sets of motion prediction errors, and means for reconstructing each of the frames of the reconstructed progressive video signal from a reference picture and a respective one of the sets of motion prediction errors provided by inverse transform means.

17. System for deriving a recording signal for transfer to a medium, the recording signal being derived from an input video signal, and for deriving an output video signal from the recording signal reproduced from the medium, the recording signal having a constant bit rate substantially lower than the input video signal and the output video signal, the input video signal and the output video signal having a field rate of 60 Hz, the input video signal being derived from a motion picture film source using 2–3 pulldown, the system comprising:

an encoding apparatus comprising:

detecting means for detecting duplicate fields in the input video signal, control signal generating means for generating a control signal having a state indicating each of the detected duplicated fields, eliminating means, operating in response to the state of the control signal, for eliminating the duplicate fields from the input video signal, generating means, operating on the input video signal following elimination of the duplicate fields by the eliminating means, for generating a progressive video signal composed of frames and having a frame rate of 24 Hz, coding means for coding the frames of the progressive video signal to produce respective frames of the recording signal, and multiplexing means for including the control signal in each of the frames of the coded video signal, the state of the control signal indicating the frames of the coded video signal resulting from coding the lost-field frames of the progressive video signal; and a decoding apparatus comprising:

decoding means for decoding the frames of the recording signal to provide respective frames of a reconstructed progressive video signal, extracting means for extracting the control signal from the frames of the recording signal, and field deriving means, operating in response to the control signal extracted from each one of the frames of the coded video signal, for deriving three fields of the interlaced output video signal from the respective one of the frames of the reconstructed progressive video signal when the state of the control signal indicates that the one of the frames of the coded video signal resulted from coding one of the lost-field frames, and for deriving two fields of the interlaced output video signal from all others of the frames of the reconstructed progressive video signal.

18. The system of claim 17, wherein:

in the encoding apparatus, the coding means comprises:

transform means for orthogonally transforming frames of the progressive video signal to produce respective sets of transform coefficients, means for including the sets of transform coefficients in the recording signal, decoding means for locally decoding the sets of transform coefficients using an inverse orthogonal transform to produce respective locally-decoded pictures, and means for applying predictive coding to ones of the frames of the progressive video signal using, for each of the frames of the progressive video signal, a selected one of the locally-decoded pictures as a reference picture; and the decoding means additionally includes:

means for deriving the sets of transform coefficients from the recording signal, means for applying an inverse orthogonal transform to the sets of transform coefficients to provide respective sets of motion prediction errors, and means for reconstructing respective frames of the reconstructed progressive video signal from the sets of motion prediction errors.

19. The system of claim 17, wherein:

in the encoding apparatus:

in lieu of including the control signal in each of the frames of the video signal, the multiplexing means includes in the recording signal as a control signal vbv_buffer_size data indicating a size for a hypothetical video buffer verifier used by a control means in the coding means to control coding of the coded progressive video signal, and the coding means comprises:

transform means for orthogonally transforming the frames of the progressive video signal to produce respective sets of transform coefficients;

quantizing means for quantizing the sets of transform coefficients to produce respective sets of quantized coefficients; and means for including the sets of quantized coefficients in the recording signal, and the control means in the coding means controls the quantizing means using a hypothetical video buffer verifier with the size thereof reduced to vbv_buffer_size ×⅘; and in the decoding apparatus:

the extracting means is for extracting the vbv_buffer_size data from the recording signal, and the decoding apparatus additionally includes an input buffer means for receiving the recorded signal, the buffer means having a size defined by the vbv_buffer_size data from the extracting means.

20. The system of claim 17, wherein: in the encoding apparatus, the coding means is additionally for adding a picture header to each of the frames of the recording signal, and for including the control signal in the picture header of each of the frames; and in the decoding apparatus, the extracting means is for extracting the control signal from the picture header of each of the frames of the recording signal.

21. The system of claim 20, wherein:

in the encoding apparatus, in lieu of including the control signal in the picture header of each of the frames of the recording signal, the coding means includes the control signal in the picture header of only the frames resulting from coding the lost-field frames; and in the decoding apparatus, the deriving means derives three fields of the interlaced output video signal from those frames of the reconstructed progressive video signal resulting from decoding the frames of the recording signal the picture header whereof includes the control signal.

22. A method for generating, from an input video signal, a coded video signal for transfer to a medium at a constant bit rate, the input video signal having a field rate of 60 Hz and being derived from a motion picture film source using 2–3 pulldown, the method comprising steps of:

providing:

a hypothetical video buffer verifier having a size defined by vbv_buffer_size, and an output buffer;

detecting duplicate fields in the input video signal;

eliminating from the input video signal the duplicate fields detected in the detecting step;

generating a progressive video signal from the fields of the input video signal that remain following the eliminating step, the progressive video signal comprising plural frames with a frame rate of 24 Hz;

coding the progressive video signal to produce the coded video signal, the frames of the progressive video signal being coded with different numbers of bits;

temporarily storing the coded video signal in the output buffer prior to transferring the coded video signal to the medium; and controlling the coding step using the hypothetical video buffer verifier with the size thereof reduced to vbv_buffer_size $\times 4/5$ to prevent input buffer overflow resulting from a duplication of fields that occurs when the coded video signal is decoded to provide a decoded video signal having a field rate of 60 Hz.

23. The method of claim 22, wherein:

the coding step comprises steps of:
- orthogonally transforming the frames of the progressive video signal to produce respective sets of transform coefficients,
- quantizing the sets of transform coefficients to produce respective sets of quantized coefficients, and
- temporarily storing the sets of quantized coefficients in the output buffer as part of the coded video signal; and in the step of controlling the coding step, the quantizing step is controlled using the hypothetical video buffer verifier with the size thereof reduced to vbv_buffer_size $\times 4/5$.

24. Apparatus for generating, from an input video signal, a coded video signal for transfer to a medium at a constant bit rate, the input video signal having a field rate of 60 Hz and being derived from a motion picture film source using 2–3 pulldown, the apparatus comprising:

- detecting means for detecting duplicate fields in the input video signal;
- eliminating means for eliminating from the input video signal the duplicate fields detected by the detecting means;
- generating means for generating a progressive video signal from the fields of the input video signal remaining following elimination of the duplicate fields by the eliminating means, the progressive video signal being composed of frames and having a frame rate of 24 Hz;
- coding means for coding the progressive video signal to produce the coded video signal, the frames of the progressive video signal being coded with different numbers of bits;
- output buffer means for temporarily storing the coded video signal prior to transfer of the coded video signal to the medium; and
- control means for controlling the coding means using the hypothetical video buffer verifier with the size thereof reduced to vbv_buffer_size $\times 4/5$ to prevent input buffer overflow resulting from a duplication of fields that occurs when the coded video signal is decoded to provide a decoded video signal having a field rate of 60 Hz.

25. The apparatus of claim 24, wherein:

the coding means comprises:
- transform means for orthogonally transforming the frames of the progressive video signal to produce respective sets of transform coefficients,
- quantizing means for quantizing the sets of transform coefficients to produce respective sets of quantized coefficients,
- means for temporarily storing the sets of quantized coefficients in the output buffer as part of the coded video signal; and the control means controls the quantizing means using the hypothetical video buffer verifier with the size thereof reduced to vbv_buffer_size $\times 4/5$.

* * * * *